(12) United States Patent
Quanci et al.

(10) Patent No.: US 12,227,699 B2
(45) Date of Patent: Feb. 18, 2025

(54) OVEN HEALTH OPTIMIZATION SYSTEMS AND METHODS

(71) Applicant: SUNCOKE TECHNOLOGY AND DEVELOPMENT LLC, Lisle, IL (US)

(72) Inventors: John Francis Quanci, Haddonfield, NJ (US); Jason Crum, Lisle, IL (US); Rakshak Khanna, Lisle, IL (US); Daniel C. Charles, Lisle, IL (US); Chun Wai Choi, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 285 days.

(21) Appl. No.: 17/135,483

(22) Filed: Dec. 28, 2020

(65) Prior Publication Data

US 2021/0198579 A1    Jul. 1, 2021

Related U.S. Application Data

(60) Provisional application No. 62/953,817, filed on Dec. 26, 2019.

(51) Int. Cl.
| | |
|---|---|
| *C10B 41/00* | (2006.01) |
| *C10B 15/02* | (2006.01) |
| *C10B 45/00* | (2006.01) |
| *G05B 23/02* | (2006.01) |

(52) U.S. Cl.
CPC ............. *C10B 41/00* (2013.01); *C10B 45/00* (2013.01); *G05B 23/0232* (2013.01); *G05B 23/0283* (2013.01); *C10B 15/02* (2013.01)

(58) Field of Classification Search
None
See application file for complete search history.

(56) References Cited

U.S. PATENT DOCUMENTS

| | | |
|---|---|---|
| 425,797 A | 4/1890 | Hunt |
| 469,868 A | 3/1892 | Osbourn |
| 705,926 A | 7/1902 | Hemingway |
| 760,372 A | 5/1904 | Beam |
| 845,719 A | 2/1907 | Schniewind |
| 875,989 A | 1/1908 | Garner |

(Continued)

FOREIGN PATENT DOCUMENTS

| | | |
|---|---|---|
| CA | 1172895 | 8/1984 |
| CA | 2775992 | 5/2011 |

(Continued)

OTHER PUBLICATIONS

Lipunov, P.V., Motrich, S.V., Markov, V.I. et al. Diagnostics of the heating system and lining of coke ovens. Coke Chem. 57, 489-492 (2014). https://doi.org/10.3103/S1068364X14120035.*

(Continued)

*Primary Examiner* — Jonathan Luke Pilcher
(74) *Attorney, Agent, or Firm* — Perkins Coie LLP; Vijay S. Kumar

(57) ABSTRACT

Systems and methods for an overall oven health optimization system and method are disclosed. The oven health optimization system computes one or more metrics to measure/compare oven health performance data, computes oven life indicator values, generates one or more oven health performance plans, and so on, based on oven operation and/or inspection data parameters.

13 Claims, 16 Drawing Sheets

(56) References Cited

U.S. PATENT DOCUMENTS

| | | |
|---|---|---|
| 976,580 A | 7/1909 | Krause |
| 1,140,798 A | 5/1915 | Carpenter |
| 1,378,782 A | 5/1921 | Floyd |
| 1,424,777 A | 8/1922 | Schondeling |
| 1,429,346 A | 9/1922 | Horn |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Klaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,895,202 A | 1/1933 | Montgomery |
| 1,947,499 A | 2/1934 | Schrader et al. |
| 1,955,962 A | 4/1934 | Jones |
| 1,979,507 A | 11/1934 | Underwood |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,283 A | 1/1944 | Vladu |
| 2,340,981 A | 2/1944 | Otto |
| 2,343,034 A | 2/1944 | Weber |
| 2,394,173 A | 2/1946 | Harris et al. |
| 2,424,012 A | 7/1947 | Bangham et al. |
| 2,486,199 A | 10/1949 | Nier |
| 2,609,948 A | 9/1952 | Laveley |
| 2,641,575 A | 6/1953 | Otto |
| 2,649,978 A | 8/1953 | Smith |
| 2,667,185 A | 1/1954 | Beavers |
| 2,723,725 A | 11/1955 | Keiffer |
| 2,756,842 A | 7/1956 | Chamberlin et al. |
| 2,765,266 A | 10/1956 | Throop et al. |
| 2,813,708 A | 11/1957 | Frey |
| 2,827,424 A | 3/1958 | Homan |
| 2,873,816 A | 2/1959 | Emil et al. |
| 2,902,991 A | 9/1959 | Whitman |
| 2,907,698 A | 10/1959 | Schulz |
| 2,968,083 A | 1/1961 | Lentz et al. |
| 3,010,882 A | 11/1961 | Barclay et al. |
| 3,015,893 A | 1/1962 | McCreary |
| 3,026,715 A | 3/1962 | Briggs |
| 3,033,764 A | 5/1962 | Hannes |
| 3,085,582 A | 4/1963 | Slosman |
| 3,175,961 A | 3/1965 | Samson |
| 3,199,135 A | 8/1965 | Trucker |
| 3,224,805 A | 12/1965 | Clyatt |
| 3,259,551 A | 7/1966 | Thompson |
| 3,265,044 A | 8/1966 | Juchtern |
| 3,267,913 A | 8/1966 | Jakob |
| 3,327,521 A | 6/1967 | Briggs |
| 3,342,990 A | 9/1967 | Barrington et al. |
| 3,444,046 A | 5/1969 | Harlow |
| 3,444,047 A | 5/1969 | Wilde |
| 3,448,012 A | 6/1969 | Allred |
| 3,453,839 A | 7/1969 | Sabin |
| 3,462,345 A | 8/1969 | Kernan |
| 3,462,346 A | 8/1969 | Kernan et al. |
| 3,511,030 A | 5/1970 | Brown et al. |
| 3,542,650 A | 11/1970 | Kulakov |
| 3,545,470 A | 12/1970 | Paton |
| 3,587,198 A | 6/1971 | Hensel |
| 3,591,827 A | 7/1971 | Hall |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 10/1974 | Pries |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A | 1/1976 | Lohrmann |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,979,870 A | 9/1976 | Moore |
| 3,984,289 A | 10/1976 | Sustarsic et al. |
| 3,990,948 A | 11/1976 | Lindgren |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | McDonald |
| 4,059,885 A | 11/1977 | Oldengott |
| 4,065,059 A | 12/1977 | Jablin |
| 4,067,462 A | 1/1978 | Thompson |
| 4,077,848 A | 3/1978 | Grainer et al. |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,100,889 A | 7/1978 | Chayes |
| 4,111,757 A | 9/1978 | Carimboli |
| 4,124,450 A | 11/1978 | MacDonald |
| 4,133,720 A | 1/1979 | Franzer et al. |
| 4,135,948 A | 1/1979 | Mertens et al. |
| 4,141,796 A | 2/1979 | Clark et al. |
| 4,143,104 A | 3/1979 | van Konijnenburg et al. |
| 4,145,195 A | 3/1979 | Knappstein et al. |
| 4,147,230 A | 4/1979 | Ormond et al. |
| 4,162,546 A | 7/1979 | Shortell et al. |
| 4,176,013 A | 11/1979 | Garthus et al. |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus et al. |
| 4,225,393 A | 9/1980 | Gregor et al. |
| 4,226,113 A | 10/1980 | Pelletier et al. |
| 4,230,498 A | 10/1980 | Ruecki |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |

(56) References Cited

U.S. PATENT DOCUMENTS

| | | |
|---|---|---|
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,298,497 A | 11/1981 | Colombo |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,316,435 A | 2/1982 | Nagamatsu et al. |
| 4,324,568 A | 4/1982 | Wilcox et al. |
| 4,330,372 A | 5/1982 | Cairns et al. |
| 4,334,963 A | 6/1982 | Stog |
| 4,336,107 A | 6/1982 | Irwin |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,385,962 A | 5/1983 | Stewen et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,406,619 A | 9/1983 | Oldengott |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,441,892 A | 4/1984 | Schuster |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,518,461 A | 5/1985 | Gelfand |
| 4,527,488 A | 7/1985 | Lindgren |
| 4,564,420 A | 1/1986 | Spindeler et al. |
| 4,568,424 A | 2/1986 | Bauer |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,749,446 A | 6/1988 | van Laar et al. |
| 4,793,981 A | 12/1988 | Doyle et al. |
| 4,821,473 A | 4/1989 | Cowell |
| 4,824,614 A | 4/1989 | Jones et al. |
| 4,889,698 A | 12/1989 | Moller et al. |
| 4,898,021 A | 2/1990 | Weaver et al. |
| 4,918,975 A | 4/1990 | Voss |
| 4,919,170 A | 4/1990 | Kallinich et al. |
| 4,929,179 A | 5/1990 | Breidenbach et al. |
| 4,941,824 A | 7/1990 | Holter et al. |
| 5,013,408 A | 5/1991 | Asai et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,398,543 A | 3/1995 | Fukushima et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A | 1/1997 | Hippe et al. |
| 5,603,810 A | 2/1997 | Michler |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,705,037 A | 1/1998 | Reinke et al. |
| 5,715,962 A | 2/1998 | McDonnell |
| 5,720,855 A | 2/1998 | Baird |
| 5,745,969 A * | 5/1998 | Yamada ............... C10B 29/06 264/30 |
| 5,752,548 A | 5/1998 | Matsumoto et al. |
| 5,752,993 A | 5/1998 | Eatough et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,881,551 A | 3/1999 | Dang |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,002,993 A | 12/1999 | Naito et al. |
| 6,003,706 A | 12/1999 | Rosen |
| 6,017,214 A | 1/2000 | Sturgulewski |
| 6,022,112 A * | 2/2000 | Isler .................... F27D 21/02 359/503 |
| 6,059,932 A | 5/2000 | Sturgulewski |
| 6,126,910 A | 10/2000 | Wilhelm et al. |
| 6,139,692 A | 10/2000 | Tamura et al. |
| 6,152,668 A | 11/2000 | Knoch |
| 6,156,688 A | 12/2000 | Ando et al. |
| 6,173,679 B1 | 1/2001 | Bruckner et al. |
| 6,187,148 B1 | 2/2001 | Sturgulewski |
| 6,189,819 B1 | 2/2001 | Racine |
| 6,244,457 B1 | 6/2001 | Piotrowski et al. |
| 6,290,494 B1 | 9/2001 | Barkdoll |
| 6,412,221 B1 | 7/2002 | Emsbo |
| 6,495,268 B1 | 12/2002 | Harth, III et al. |
| 6,539,602 B1 | 4/2003 | Ozawa et al. |
| 6,596,128 B2 | 7/2003 | Westbrook |
| 6,626,984 B1 | 9/2003 | Taylor |
| 6,699,035 B2 | 3/2004 | Brooker |
| 6,712,576 B2 | 3/2004 | Skarzenski et al. |
| 6,758,875 B2 | 7/2004 | Reid et al. |
| 6,786,941 B2 | 9/2004 | Reeves et al. |
| 6,830,660 B1 | 12/2004 | Yamauchi et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,547,377 B2 | 6/2009 | Inamasu et al. |

(56) References Cited

U.S. PATENT DOCUMENTS

| | | |
|---|---|---|
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 | 11/2010 | Crane |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,172,930 B2 | 5/2012 | Barkdoll |
| 8,236,142 B2 | 8/2012 | Westbrook |
| 8,266,853 B2 | 9/2012 | Bloom et al. |
| 8,311,777 B2 * | 11/2012 | Sugiura .............. G01B 11/2522 356/600 |
| 8,383,055 B2 | 2/2013 | Palmer |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,568,568 B2 | 10/2013 | Schuecker et al. |
| 8,640,635 B2 | 2/2014 | Bloom et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,169,439 B2 | 10/2015 | Sarpen et al. |
| 9,193,913 B2 | 11/2015 | Quanci et al. |
| 9,193,915 B2 | 11/2015 | West et al. |
| 9,200,225 B2 | 12/2015 | Barkdoll et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,273,250 B2 | 3/2016 | Choi et al. |
| 9,321,965 B2 | 4/2016 | Barkdoll |
| 9,359,554 B2 | 6/2016 | Quanci et al. |
| 9,404,043 B2 | 8/2016 | Kim |
| 9,463,980 B2 | 10/2016 | Fukada et al. |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,392,563 B2 | 8/2019 | Kim et al. |
| 10,435,042 B1 | 10/2019 | Weymouth |
| 10,526,541 B2 | 1/2020 | West et al. |
| 10,578,521 B1 | 3/2020 | Dinakaran et al. |
| 10,611,965 B2 | 4/2020 | Quanci et al. |
| 10,619,101 B2 | 4/2020 | Quanci et al. |
| 10,732,621 B2 | 8/2020 | Cella et al. |
| 10,877,007 B2 | 12/2020 | Steele et al. |
| 10,883,051 B2 | 1/2021 | Quanci et al. |
| 10,920,148 B2 | 2/2021 | Quanci et al. |
| 10,927,303 B2 | 2/2021 | Choi et al. |
| 10,947,455 B2 | 3/2021 | Quanci et al. |
| 10,968,393 B2 | 4/2021 | West et al. |
| 10,968,395 B2 | 4/2021 | Quanci et al. |
| 10,975,309 B2 | 4/2021 | Quanci et al. |
| 10,975,310 B2 | 4/2021 | Quanci et al. |
| 10,975,311 B2 | 4/2021 | Quanci et al. |
| 11,008,517 B2 | 5/2021 | Chun et al. |
| 11,008,518 B2 | 5/2021 | Quanci et al. |
| 11,021,655 B2 | 6/2021 | Quanci et al. |
| 11,053,444 B2 | 7/2021 | Quanci et al. |
| 11,098,252 B2 | 8/2021 | Quanci et al. |
| 11,117,087 B2 | 9/2021 | Quanci |
| 11,142,699 B2 | 10/2021 | West et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2004/0016377 A1 | 1/2004 | Johnson et al. |
| 2004/0220840 A1 | 11/2004 | Bonissone et al. |
| 2005/0087767 A1 | 4/2005 | Fitzgerald et al. |
| 2005/0096759 A1 | 5/2005 | Benjamin et al. |
| 2006/0029532 A1 | 2/2006 | Breen et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0102278 A1 | 5/2007 | Inamasu et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0116052 A1 | 5/2008 | Eatough et al. |
| 2008/0179165 A1 | 7/2008 | Chen et al. |
| 2008/0250863 A1 | 10/2008 | Moore |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0105852 A1 | 4/2009 | Wintrich et al. |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0015564 A1 | 1/2010 | Chun et al. |
| 2010/0095521 A1 | 4/2010 | Kartal et al. |
| 2010/0095752 A1 * | 4/2010 | Sugiura .................. C10B 45/00 73/104 |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1 | 4/2011 | Baird |
| 2011/0088600 A1 | 4/2011 | McRae |
| 2011/0100273 A1 | 5/2011 | Ptacek |
| 2011/0120852 A1 | 5/2011 | Kim |
| 2011/0144406 A1 | 6/2011 | Masatsugu et al. |
| 2011/0156902 A1 | 6/2011 | Wang et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0179421 A1 | 7/2012 | Dasgupta |
| 2012/0180133 A1 | 7/2012 | Ai-Harbi et al. |
| 2012/0195815 A1 | 8/2012 | Moore et al. |
| 2012/0228115 A1 | 9/2012 | Westbrook |

(56) References Cited

U.S. PATENT DOCUMENTS

| | | |
|---|---|---|
| 2012/0247939 A1 | 10/2012 | Kim et al. |
| 2012/0285080 A1 | 11/2012 | Despen et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0213114 A1 | 8/2013 | Wetzig et al. |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0156584 A1 | 6/2014 | Motukuri et al. |
| 2014/0182683 A1 | 7/2014 | Quanci et al. |
| 2014/0208997 A1 | 7/2014 | Alferyev et al. |
| 2014/0224123 A1 | 8/2014 | Walters |
| 2014/0262726 A1 | 9/2014 | West et al. |
| 2015/0041304 A1 | 2/2015 | Kiim et al. |
| 2015/0075962 A1 | 3/2015 | Shimoyama et al. |
| 2015/0122629 A1 | 5/2015 | Freimuth et al. |
| 2015/0143908 A1 | 5/2015 | Cetinkaya |
| 2015/0175433 A1 | 6/2015 | Micka et al. |
| 2015/0176095 A1 | 6/2015 | Connors et al. |
| 2015/0219530 A1 | 8/2015 | Li et al. |
| 2015/0226499 A1 | 8/2015 | Mikkelsen |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0319198 A1 | 11/2016 | Quanci et al. |
| 2016/0370082 A1 | 12/2016 | Olivo |
| 2016/0377430 A1 | 12/2016 | Kalagnanam et al. |
| 2017/0173519 A1 | 6/2017 | Naito |
| 2017/0182447 A1 | 6/2017 | Sappok et al. |
| 2017/0183569 A1 | 6/2017 | Quanci et al. |
| 2017/0226425 A1 | 8/2017 | Kim et al. |
| 2017/0261417 A1 | 9/2017 | Zhang |
| 2017/0313943 A1 | 11/2017 | Valdevies |
| 2017/0352243 A1 | 12/2017 | Quanci et al. |
| 2018/0340122 A1 | 11/2018 | Crum et al. |
| 2019/0169503 A1 | 6/2019 | Chun et al. |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |
| 2020/0206669 A1 | 7/2020 | Quanci |
| 2020/0206683 A1 | 7/2020 | Quanci |
| 2020/0208058 A1 | 7/2020 | Quanci |
| 2020/0208059 A1 | 7/2020 | Quanci |
| 2020/0208060 A1 | 7/2020 | Quanci |
| 2020/0208062 A1 | 7/2020 | Quanci |
| 2020/0208063 A1 | 7/2020 | Quanci |
| 2020/0208833 A1 | 7/2020 | Quanci |
| 2020/0231876 A1 | 7/2020 | Quanci et al. |
| 2020/0407641 A1 | 12/2020 | Quanci et al. |
| 2021/0024828 A1 | 1/2021 | Ball et al. |
| 2021/0032541 A1 | 2/2021 | Crum et al. |
| 2021/0040391 A1 | 2/2021 | Quanci et al. |
| 2021/0130697 A1 | 5/2021 | Quanci et al. |
| 2021/0163821 A1 | 6/2021 | Quanci et al. |
| 2021/0163822 A1 | 6/2021 | Quanci et al. |
| 2021/0163823 A1 | 6/2021 | Quanci et al. |
| 2021/0261877 A1 | 8/2021 | Despen et al. |
| 2021/0340454 A1 | 11/2021 | Quanci et al. |
| 2021/0363426 A1 | 11/2021 | West et al. |
| 2021/0363427 A1 | 11/2021 | Quanci et al. |
| 2021/0371752 A1 | 12/2021 | Quanci et al. |
| 2021/0388270 A1 | 12/2021 | Choi et al. |
| 2022/0056342 A1 | 2/2022 | Quanci et al. |
| 2022/0251452 A1 | 8/2022 | Quanci et al. |
| 2022/0298423 A1 | 9/2022 | Quanci et al. |
| 2022/0325183 A1 | 10/2022 | Quanci et al. |
| 2022/0356410 A1 | 11/2022 | Quanci et al. |
| 2023/0012031 A1 | 1/2023 | Quanci et al. |
| 2023/0258326 A1 | 8/2023 | Quanci et al. |
| 2023/0360511 A1 | 11/2023 | Quanci et al. |
| 2023/0416629 A1 | 12/2023 | Quanci et al. |
| 2024/0059994 A1 | 2/2024 | Quanci et al. |
| 2024/0110103 A1 | 4/2024 | Quanci et al. |
| 2024/0132780 A1 | 4/2024 | Quanci et al. |
| 2024/0150659 A1 | 5/2024 | Quanci et al. |
| 2024/0150667 A1 | 5/2024 | Quanci et al. |

FOREIGN PATENT DOCUMENTS

| | | |
|---|---|---|
| CA | 2822841 | 7/2012 |
| CA | 2822857 | 7/2012 |
| CA | 2905110 A1 | 9/2014 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 101211495 A | 7/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 101910530 A | 12/2010 |
| CN | 102072829 A | 5/2011 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 202470353 U | 10/2012 |
| CN | 103399536 A | 11/2013 |
| CN | 103468289 A | 12/2013 |
| CN | 103913193 A | 7/2014 |
| CN | 203981700 U | 12/2014 |
| CN | 104498059 A | 4/2015 |
| CN | 105001914 A | 10/2015 |
| CN | 105137947 A | 12/2015 |
| CN | 105189704 A | 12/2015 |
| CN | 105264448 A | 1/2016 |
| CN | 105467949 A | 4/2016 |
| CN | 106399607 A | 2/2017 |
| CN | 106661456 A | 5/2017 |
| CN | 106687564 A | 5/2017 |
| CN | 107022359 A | 8/2017 |
| CN | 107267183 A | 10/2017 |
| CN | 107445633 A | 12/2017 |
| CN | 108219807 A | 6/2018 |
| CN | 100500619 C | 6/2020 |
| CN | 111778048 A | 10/2020 |
| CN | 113322085 A | 8/2021 |
| CN | 113462415 A | 10/2021 |
| CN | 114517099 A | 5/2022 |
| CN | 101921643 B | 12/2022 |
| DE | 201729 C | 9/1908 |
| DE | 212176 | 7/1909 |
| DE | 1212037 B | 3/1966 |
| DE | 2212544 A | 1/1973 |
| DE | 2720688 A1 | 11/1978 |
| DE | 3231697 C1 | 1/1984 |
| DE | 3328702 A1 | 2/1984 |

(56) References Cited

FOREIGN PATENT DOCUMENTS

| | | |
|---|---|---|
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102004062936 A1 | 7/2006 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EA | 010510 B1 | 10/2008 |
| EP | 0126399 A1 | 11/1984 |
| EP | 0208490 A1 | 1/1987 |
| EP | 0903393 A2 | 3/1999 |
| EP | 1538503 A1 | 6/2005 |
| EP | 1860034 A1 | 11/2007 |
| EP | 2295129 A1 | 3/2011 |
| EP | 2468837 A1 | 6/2012 |
| FR | 2339664 | 8/1977 |
| FR | 2517802 | 6/1983 |
| FR | 2764978 | 12/1998 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 783720 A | 9/1957 |
| GB | 871094 | 6/1961 |
| GB | 923205 A | 5/1963 |
| GB | 2000193 A | 1/1979 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | H0776713 A | 3/1995 |
| JP | 07188668 | 7/1995 |
| JP | 07216357 | 8/1995 |
| JP | H07204432 | 8/1995 |
| JP | H0843314 A * | 2/1996 |
| JP | H08104875 A | 4/1996 |
| JP | 08127778 | 5/1996 |
| JP | H08218071 A * | 8/1996 |
| JP | H09310074 A | 12/1997 |
| JP | H10273672 A | 10/1998 |
| JP | H11131074 | 5/1999 |
| JP | H11256166 A | 9/1999 |
| JP | 2000204373 A | 7/2000 |
| JP | 2000219883 A | 8/2000 |
| JP | 2001055576 A | 2/2001 |
| JP | 2001187887 A | 7/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003051082 A | 2/2003 |
| JP | 2003071313 A | 3/2003 |
| JP | 2003292968 A | 10/2003 |
| JP | 2003342581 A | 12/2003 |
| JP | 2004169016 A | 6/2004 |
| JP | 2005503448 A | 2/2005 |
| JP | 2005135422 A | 5/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 3924064 B2 * | 6/2007 |
| JP | 2007169484 A | 7/2007 |
| JP | 2007231326 A | 9/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009135276 A | 6/2009 |
| JP | 2009144121 | 7/2009 |
| JP | 2009209286 A | 9/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012072389 A | 4/2012 |
| JP | 2012102302 | 5/2012 |
| JP | 2012102325 | 5/2012 |
| JP | 2013006957 A | 1/2013 |
| JP | 2013510910 | 3/2013 |
| JP | 2013189322 A | 9/2013 |
| JP | 2014009284 A | 1/2014 |
| JP | 2014040502 A | 3/2014 |
| JP | 2015094091 A | 5/2015 |
| JP | 2015199791 A | 11/2015 |
| JP | 2016169897 A | 9/2016 |
| JP | 2020007472 A | 1/2020 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020040020883 A | 3/2004 |
| KR | 20040107204 A | 12/2004 |
| KR | 20050053861 A | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20110121705 A * | 11/2011 |
| KR | 20120033091 A | 4/2012 |
| KR | 20130050807 | 5/2013 |
| KR | 101318388 | 10/2013 |
| KR | 20140042526 A | 4/2014 |
| KR | 20140076155 A | 6/2014 |
| KR | 20150011084 A | 1/2015 |
| KR | 20150068557 A | 6/2015 |
| KR | 20170038102 A | 4/2017 |
| KR | 20170058808 A | 5/2017 |
| KR | 20170103857 A | 9/2017 |
| KR | 101862491 B1 | 5/2018 |
| RU | 2083532 C1 | 7/1997 |
| RU | 2441898 C2 | 2/2012 |
| RU | 2493233 C2 | 9/2013 |

(56) References Cited

FOREIGN PATENT DOCUMENTS

| | | |
|---|---|---|
| SU | 1535880 A1 | 1/1990 |
| TW | 201241166 A1 | 10/2012 |
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2003025093 | 3/2003 |
| WO | WO2005023649 | 3/2005 |
| WO | WO2005031297 | 4/2005 |
| WO | WO2005115583 | 12/2005 |
| WO | WO2007103649 | 9/2007 |
| WO | WO2008034424 | 3/2008 |
| WO | WO2008105269 | 9/2008 |
| WO | WO-2009147983 A1 * 12/2009 ............ C10B 29/06 |
| WO | WO2010032734 | 3/2010 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2013145679 | 10/2013 |
| WO | WO2013153557 | 10/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |
| WO | WO2016033515 | 3/2016 |
| WO | WO2016086322 | 6/2016 |
| WO | WO2016109854 | 7/2016 |
| WO | WO2022159604 | 7/2022 |
| WO | WO2022235839 | 11/2022 |

OTHER PUBLICATIONS

De Cordova, Mariano & Madias, Jorge. (2015). Coke oven life prolongation—A multidisciplinary approach. 10.5151/2594-357X-26410.*
PE2E translation of JP H0843314.*
PE2E translation of JP 3924064.*
PE2E translation of KR 20110121705.*
PE2E translation of JP H08218071.*
PE2E translation of WO 2009/147983.*
U.S. Appl. No. 17/584,672, filed Jan. 26, 2022, titled Heat Recovery Oven Foundation.
U.S. Appl. No. 16/729,219, now U.S. Pat. No. 11,098,252, filed Dec. 27, 2019, titled Spring-Loaded Heat Recovery Oven System and Method.
U.S. Appl. No. 18/168,142, filed Feb. 13, 2023, Quanci et al.
Tiwari, et al., "A novel technique for assessing the coking potential of coals/cole blends for non-recovery coke making process," Fuel, vol. 107, May 2013, pp. 615-622.
U.S. Appl. No. 14/921,723, filed Oct. 23, 2015, titled Reduced Output Rate Coke Oven Operation With Gas Sharing Providing Extended Process Cycle.
U.S. Appl. No. 14/655,204, now U.S. Pat. No. 10,016,714, filed Jun. 24, 2015, titled Systems and Methods for Removing Mercury From Emissions.
U.S. Appl. No. 16/000,516, now U.S. Pat. No. 11,117,087, filed Jun. 5, 2018, titled Systems and Methods for Removing Mercury From Emissions.
U.S. Appl. No. 16/026,363, filed Jul. 3, 2018, titled Non-Perpendicular Connections Between Coke Oven Uptakes and a Hot Common Tunnel, and Associated Systems and Methods.
U.S. Appl. No. 17/140,564, filed Jan. 4, 2021, titled Methods and Systems for Improved Coke Quenching.
U.S. Appl. No. 14/655,003, filed Jun. 23, 2015, titled Systems and Methods for Maintaining a Hot Car in a Coke Plant.
U.S. Appl. No. 16/897,957, filed Jun. 10, 2020, titled Systems and Methods for Maintaining a Hot Car in a Coke Plant.
U.S. Appl. No. 16/704,689, filed Dec. 5, 2019, titled Horizontal Heat Recovery Coke Ovens Having Monolith Crowns.
U.S. Appl. No. 13/589,009, filed Aug. 17, 2012, titled Automatic Draft Control System for Coke Plants.
U.S. Appl. No. 17/176,391, filed Feb. 16, 2021, titled Automatic Draft Control System for Coke Plants.
U.S. Appl. No. 16/828,448, filed Mar. 24, 2020, titled Coke Plant Including Exhaust Gas Sharing.
U.S. Appl. No. 13/730,673, filed Dec. 28, 2012, titled Exhaust Flow Modifier, Duct Intersection Incorporating the Same, and Methods Therefor.
U.S. Appl. No. 17/191,119, filed March 3, 3021, titled Exhaust Flow Modifier, Duck Intersection Incorporating the Same, and Methods Therefor.
U.S. Appl. No. 14/839,384, filed Aug. 28, 2015, titled Coke Oven Charging System.
U.S. Appl. No. 16/845,530, filed Apr. 10, 2020, titled Methods for Decarbonizing Coking Ovens, and Associated Systems and Devices.
U.S. Appl. No. 17/172,476, filed Feb. 10, 2021, titled Integrated Coke Plant Automation and Optimization Using Advanced Control and Optimization Techniques.
U.S. Appl. No. 17/155,219, filed Jan. 22, 2021, titled Improved Burn Profiles for Coke Operations.
U.S. Appl. No. 16/735,103, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 17/076,563, filed Oct. 21, 2020, titled System and Method for Repairing a Coke Oven.
U.S. Appl. No. 16/729,053, filed Dec. 27, 2019, titled Oven Uptakes.
U.S. Appl. No. 16/729,036, filed Dec. 27, 2019, titled Systems and Methods for Treating a Surface of a Coke Plant.
U.S. Appl. No. 16/729,122, filed Dec. 27, 2019, titled Methods and Systems for Providing Corrosion Resistant Surfaces in Contaminant Treatment Systems.
U.S. Appl. No. 16/729,068, filed Dec. 27, 2019, titled Systems and Methods for Utilizing Flue Gas.
U.S. Appl. No. 16/729,170, filed Dec. 27, 2019, titled Coke Plant Tunnel Repair and Anchor Distribution.
U.S. Appl. No. 16/729,157, filed Dec. 27, 2019, titled Particulate Detection for Industrial Facilities, and Associated Systems and Methods.
U.S. Appl. No. 16/729,212, filed Dec. 27, 2019, now U.S. Pat. No. 11,021,655, titled Heat Recovery Oven Foundation.
U.S. Appl. No. 17/843,164, filed Jun. 17, 2022, Quanci et al.
U.S. Appl. No. 17/947,520, filed Sep. 19, 2022, Quanci et al.
U.S. Appl. No. 17/967,615, filed Oct. 17, 2022, Quanci et al.
U.S. Appl. No. 18/047,916, filed Oct. 19, 2022, Quanci et al.
U.S. Appl. No. 18/052,739, filed Nov. 4, 2022, Quanci et al.
U.S. Appl. No. 18/052,760, filed Nov. 4, 2022, Quanci et al.
"High Alumina Cement-Manufacture, Characteristics and Uses," TheConstructor.org, https://theconstructor.org/concrete/high-alumina-cement/23686/; 12 pages.
"Refractory Castables," Victas.com, Dec. 28, 2011 (date obtained from WayBack Machine), https://www/vitcas.com/refractory-castables; 5 pages.
U.S. Appl. No. 17/155,818, filed Jan. 22, 2021, Mar. 3, 2021, Quanci et al.
U.S. Appl. No. 17/190,720, filed Mar. 3, 2021, Mar. 3, 2021, West et al.
U.S. Appl. No. 17/222,886, filed Apr. 5, 2021, Apr. 5, 2021, Quanci et al.
U.S. Appl. No. 17/228,469, filed Apr. 12, 2021, Apr. 12, 2021, Quanci et al.
U.S. Appl. No. 17/228,501, filed Apr. 12, 2021 Apr. 12, 2021, Quanci et al.
U.S. Appl. No. 17/306,895, filed May 3, 2021, May 3, 2021, Quanci et al.
U.S. Appl. No. 17/321,857, filed May 17, 2021, May 17, 2021, Quanci et al.

(56) References Cited

OTHER PUBLICATIONS

U.S. Appl. No. 17/320,343, filed May 24, 2021, May 24, 2021, Quanci et al.
U.S. Appl. No. 17/363,701, filed Jun. 30, 2021, Jun. 30, 2021, Quanci et al.
U.S. Appl. No. 17/388,874, filed Jul. 29, 2021, Jul. 29, 2021, Quanci et al.
U.S. Appl. No. 17/459,380, filed Aug. 27, 2021, Aug. 27, 2021, Quanci et al.
U.S. Appl. No. 17/471,491, filed Sep. 10, 2021, Sep. 10, 2021, West et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1 —24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
International Search Report and Written Opinion for PCT/2020/067189; Date of Mailing: Apr. 21, 2021; 8 pages.
U.S. Appl. No. 17/363,701, filed Jun. 30, 2021, Quanci et al.
U.S. Appl. No. 17/521,061, filed Nov. 8, 2021, Crum et al.
U.S. Appl. No. 17/526,477, filed Nov. 15, 2021, Quanci et al.
U.S. Appl. No. 17/532,058, filed Nov. 22, 2021, Quanci et al.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus for Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus for Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus for Compacting Coal for a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus for Producing Coke.

(56) References Cited

OTHER PUBLICATIONS

U.S. Appl. No. 12/403,391, filed Mar. 13, 2009, now U.S. Pat. No. 8,172,930, titled Cleanable in Situ Spark Arrestor.
U.S. Appl. No. 12/849,192, filed Aug. 3, 2010, now U.S. Pat. No. 9,200,225, titled Method and Apparatus for Compacting Coal for a Coal Coking Process.
U.S. Appl. No. 13/631,215, filed Sep. 28, 2012, now U.S. Pat. No. 9,683,740, titled Methods for Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/655,204, now U.S. Pat. No. 10,016,714, filed on Jun. 24, 2015, titled Systems and Methods for Removing Mercury From Emissions.
U.S. Appl. No. 16/000,516, now U.S. Pat. No. 11,117,087, filed on Jun. 5, 2018, titled Systems and Methods for Removing Mercury From Emissions.
U.S. Appl. No. 17/459,380, now, U.S. Pat. No. 11,845,037, filed on Jun. 5, 2018, titled Systems and Methods for Removing Mercury From Emissions.
U.S. Appl. No. 18/506,616, filed Nov. 10, 2023, titled Systems and Methods for Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, now U.S. Pat. No. 11,008,517, titled Non-Perpendicular Connections Between Coke Oven Uptakes and a Hot Common Tunnel, and Associated Systems and Methods.
U.S. Appl. No. 13/730,796, filed Dec. 28, 2012, now U.S. Pat. No. 10,883,051, titled Methods and Systems for Improved Coke Quenching.
U.S. Appl. No. 17/140,564, filed Jan. 4, 2021, now U.S. Pat. No. 11,807,812, titled Methods and Systems for Improved Coke Quenching.
U.S. Appl. No. 13/730,598, filed Dec. 28, 2012, now U.S. Pat. No. 9,238,778, titled Systems and Methods for Improving Quenched Coke Recovery.
U.S. Appl. No. 14/952,267, filed Nov. 25, 2015, now U.S. Pat. No. 9,862,888, titled Systems and Methods for Improving Quenched Coke Recovery.
U.S. Appl. No. 15/830,320, filed Dec. 4, 2017, now U.S. Pat. No. 10,323,192, titled Systems and Methods for Improving Quenched Coke Recovery.
U.S. Appl. No. 13/730,735, filed Dec. 28, 2012, now U.S. Pat. No. 9,273,249, titled Systems and Methods for Controlling Air Distribution in a Coke Oven.
U.S. Appl. No. 14/655,013, filed Jun. 23, 2015, now U.S. Pat. No. 11,142,699, titled Vent Stack Lids and Associated Systems and Methods.
U.S. Appl. No. 17/471,491, filed Sep. 10, 2021, now U.S. Pat. No. 11,939,526 (Mar. 26, 2024), titled Vent Stack Lids and Associated Systems and Methods.
U.S. Appl. No. 18/584,320, filed Feb. 22, 2024, titled Vent Stack Lids and Associated Systems and Methods.
U.S. Appl. No. 13/843,166, filed Mar. 15, 2013, now U.S. Pat. No. 9,273,250, titled Methods and Systems for Improved Quench Tower Design.
U.S. Appl. No. 15/014,547, filed Feb. 3, 2016, now, U.S. Pat. No. 10,927,303, titled Methods for Improved Quench Tower Design.
U.S. Appl. No. 17/155,818, filed Jan. 22, 2021, now U.S. Pat. No. 11,746,296, titled Methods and Systems for Improved Quench Tower Design.
U.S. Appl. No. 14/655,003, filed Jun. 23, 2015, now U.S. Pat. No. 10,760,002, titled Systems and Methods for Maintaining a Hot Car in a Coke Plant.
U.S. Appl. No. 16/897,957, filed Jun. 10, 2020, now U.S. Pat. No. 11,359,145, titled Systems and Methods for Maintaining a Hot Car in a Coke Plant.
U.S. Appl. No. 13/829,588, filed Mar. 14, 2013, now U.S. Pat. No. 9,193,915, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, now U.S. Pat. No. 10,968,383, titled Coke Ovens Having Monolith Component Construction.
U.S. Appl. No. 17/190,720, now U.S. Pat. No. 11,795,400, filed on Mar. 3, 2021, titled Coke Ovens Having Monolith Component Construction.
U.S. Appl. No. 13/589,009, filed Aug. 17, 2012, now U.S. Pat. No. 9,359,554, titled Automatic Draft Control System for Coke Plants.
U.S. Appl. No. 15/139,568, filed Apr. 27, 2016, now U.S. Pat. No. 10,947,455, titled Automatic Draft Control System for Coke Plants.
U.S. Appl. No. 17/176,391, now U.S. Pat. No. 11,692,138, filed Feb. 16, 2021, titled Automatic Draft Control System for Coke Plants.
U.S. Appl. No. 18/321,530, filed May 22, 2023, titled Automatic Draft Control System for Coke Plants.
U.S. Appl. No. 13/588,996, filed Aug. 17, 2012, now U.S. Pat. No. 9,243,186, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing.
U.S. Appl. No. 16/047,198, filed on Jul. 27, 2018, now U.S. Pat. No. 10,611,965, titled Coke Plant Including Exhaust Gas Sharing.
U.S. Appl. No. 16/828,448, filed Mar. 24, 2020, now U.S. Pat. No. 11,441,077, titled Coke Plant Including Exhaust Gas Sharing.
U.S. Appl. No. 13/589,004, filed Aug. 17, 2012, now U.S. Pat. No. 9,249,357, titled Method and Apparatus for Volatile Matter Sharing in Stamp-Charged Coke Ovens.
U.S. Appl. No. 13/730,673, filed Dec. 28, 2012, now U.S. Pat. No. 9,476,547, titled Exhaust Flow Modifier, Duct Intersection Incorporating the Same, and Methods Therefor.
U.S. Appl. No. 15/281,891, filed Sep. 30, 2016, now U.S. Pat. No. 10,975,309, titled Exhaust Flow Modifier, Duck Intersection Incorporating the Same, and Methods Therefor.
U.S. Appl. No. 17/191,119, filed on Mar. 3, 3021, titled Exhaust Flow Modifier, Duck Intersection Incorporating the Same, and Methods Therefor.
U.S. Appl. No. 13/598,394, filed Aug. 29, 2012, now U.S. Pat. No. 9,169,439, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, now U.S. Pat. No. 9,580,656, titled Coke Oven Charging System.
U.S. Appl. No. 15/443,246, filed Feb. 27, 2017, now U.S. Pat. No. 9,976,089, titled Coke Oven Charging System.
U.S. Appl. No. 14/587,670, filed Dec. 31, 2014, now U.S. Patent No. 10,619, 101, titled Methods for Decarbonizing Coking Ovens, and Associated Systems and Devices.
U.S. Appl. No. 16/845,530, filed Apr. 10, 2020, now U.S. Pat. No. 11,359,146, titled Methods for Decarbonizing Coking Ovens, and Associated Systems and Devices.
U.S. Appl. No. 14/984,489, filed Dec. 30, 2015, now U.S. Pat. No. 10,975,310, titled Multi-Modal Beds of Coking Material.
U.S. Appl. No. 14/983,837, filed Dec. 30, 2015, now U.S. Pat. No. 10,968,395, titled Multi-Modal Beds of Coking Material.
U.S. Appl. No. 14/986,281, filed Dec. 31, 2015, now U.S. Pat. No. 10,975,311, titled Multi-Modal Beds of Coking Material.
U.S. Appl. No. 17/222,886, filed Apr. 12, 2021, titled Multi-Modal Beds of Coking Material.
U.S. Appl. No. 14/987,625, filed Jan. 4, 2016, now U.S. Pat. No. 11,060,032, titled Integrated Coke Plant Automation and Optimization Using Advanced Control and Optimization Techniques.
U.S. Appl. No. 17/172,476, filed Feb. 10, 2021, now U.S. Pat. No. 11,788,012, titled Integrated Coke Plant Automation and Optimization Using Advanced Control and Optimization Techniques.

(56) References Cited

OTHER PUBLICATIONS

U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, now U.S. Pat. No. 11,053,444, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, now U.S. Pat. 10,920,148, titled Improved Burn Profiles for Coke Operations.
U.S. Appl. No. 17/155,719, filed Jan. 22, 2021, now U.S. Pat. No. 11,441,078, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, now U.S. Pat. No. 11,214,739, titled Method and System for Dynamically Charging a Coke Oven.
U.S. Appl. No. 15/614,525, filed Jun. 5, 2017, now U.S. Pat. No. 11,508,230, titled Methods and Systems for Automatically Generating a Remedial Action in an Industrial Facility.
U.S. Appl. No. 18/047,916, filed Oct. 19, 2022, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, now U.S. Pat. No. 11,186,778, titled System and Method for Repairing a Coke Oven.
U.S. Appl. No. 17/521,061, now U.S. Pat. No. 11,845,898, filed on Nov. 8, 2021, titled System and Method for Repairing a Coke Oven.
U.S. Appl. No. 16/729,053, filed Dec. 27, 2019, now U.S Pat. No. 11,760,937, titled Oven Uptakes.
U.S. Appl. No. 16/729,036, filed Dec. 27, 2019, now U.S. Pat. No. 11,365,355, titled Systems and Methods for Treating a Surface of a Coke Plant.
U.S. Appl. No. 17/747,708, filed May 18, 2022, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, now U.S. Pat. No. 11,395,989, titled Methods and Systems for Providing Corrosion Resistant Surfaces in Contaminant Treatment Systems.
U.S. Appl. No. 17/843,164, filed Jun. 17, 2022, now U.S. Pat. No. 11,819,802, titled Methods and Systems for Providing Corrosion Resistant Surfaces in Contaminant Treatment Systems.
U.S. Appl. No. 16/729,068, filed Dec. 27, 2019, now U.S. Pat. No. 11,486,572, titled Systems and Methods for Utilizing Flue Gas.
U.S. Appl. No. 17/947,520, filed Sep. 19, 2022, titled Systems and Methods for Utilizing Flue Gas.
U.S. Appl. No. 16/729,129, filed Dec. 27, 2019, now U.S. Pat. No. 11,008,518, titled Coke Plant Tunnel Repair and Flexible Joints.
U.S. Appl. No. 17/320,343, filed May 14, 2021, now U.S. Pat. No. 11,597,881, titled Coke Plant Tunnel Repair and Flexible Joints.
U.S. Appl. No. 18/168,142, filed Feb. 13, 2023, titled Coke Plant Tunnel Repair and Flexible Joints.
U.S. Appl. No. 16/729,170, now U.S. Pat. No. 11,193,069, filed on Dec. 27, 2019, titled Coke Plant Tunnel Repair and Anchor Distribution.
U.S. Appl. No. 17/532,058, now U.S. Pat. No. 11,505,747, filed on Nov. 22, 2021, titled Coke Plant Tunnel Repair and Anchor Distribution.
U.S. Appl. No. 17/967,615, filed Oct. 17, 2022, titled Coke Plant Tunnel Repair and Anchor Distribution.
U.S. Appl. No. 16/729,157, filed Dec. 27, 2019, now U.S. Pat. No. 11,071,935, titled Particulate Detection for Industrial Facilities, and Associated Systems and Methods.
U.S. Appl. No. 16/729,057, filed Dec. 27, 2019, now U.S. Pat. No. 11,021,655, titled Decarbonization of Coke Ovens and Associated Systems and Methods.
U.S. Appl. No. 17/321,857, filed May 17, 2021, now U.S. Pat. No. 11,643,602, titled Decarbonization of Coke Ovens and Associated Systems and Methods.
U.S. Appl. No. 18/313,622, filed May 8, 2023, titled Decarbonization of Coke Ovens and Associated Systems and Methods.
U.S. Appl. No. 16/729,212, filed Dec. 27, 2019, now U.S. Pat. No. 11,261,381, titled Heat Recovery Oven Foundation.
U.S. Appl. No. 17/584,672, now U.S. Pat. No. 11,845,897, filed Jan. 26, 2022, titled Heat Recovery Oven Foundation.
U.S. Appl. No. 18/492,913, filed Oct. 24, 2023, titled Heat Recovery Oven Foundation.
U.S. Appl. No. 16/729,219, now U.S. Pat. No. 11,098,252, filed on Dec. 27, 2019, titled Spring-Loaded Heat Recovery Oven System and Method.
U.S. Appl. No. 17/388,874, filed Jul. 29, 2021, now, U.S. Pat. No. 11,680,208, titled Spring-Loaded Heat Recovery Oven System and Method.
U.S. Appl. No. 17/736,960, filed May 20, 2022, titled Foundry Coke Products, and Associated Systems and Methods.
U.S. Appl. No. 17/306,895, now U.S. Pat. No. 11,767,482, filed on May 3, 2021, now U.S. Pat. No. 11,767,482, titled High-Quality Coke Products.
U.S. Appl. No. 18/363,465, filed Aug. 1, 2023, titled High- Quality Coke Products.
U.S. Appl. No. 18/466,549, filed Sep. 13, 2023, titled High-Quality Coke Products.
U.S. Appl. No. 18/501,488, filed Nov. 3, 2023, titled Coal Blends, Foundry Coke Products, and Associated Systems, Devices, and Methods.
U.S. Appl. No. 18/501,795, filed Nov. 3, 2023, titled Coal Blends, Foundry Coke Products, and Associated Systems, Devices, and Methods.
U.S. Appl. No. 18/052,739, filed Nov. 4, 2022, now U.S. Pat. No. 11,946,108, titled Foundry Coke Products and Associated Processing Methods Via Cupolas.
U.S. Appl. No. 18/586,236, filed Feb. 23, 2024, titled Foundry Coke Products and Associated Processing Methods Via Cupolas.
U.S. Appl. No. 18/052,760, filed Nov. 2, 2022, now U.S. Pat. No. 11,851,724, titled Foundry Coke Products, and Associated Systems, Devices, and Methods.
U.S. Appl. No. 18/506,746, filed Nov. 10, 2023, titled Foundry Coke Products, and Associated Systems, Devices, and Methods.
U.S. Appl. No. 18/511,148, filed Nov. 16, 2023, titled Products Comprising Char and Carbon, and Associated Systems, Devices, and Methods.
U.S. Appl. No. 18/511,621, filed Nov. 16, 2023, titled Pelletized Products and Associated Systems, Devices, and Methods.
U.S. Appl. No. 18/492,913, filed Oct. 24, 2023, Quanci et al.
U.S. Appl. No. 18/506,616, filed Nov. 10, 2023, Quanci et al.
U.S. Appl. No. 18/506,746, filed Nov. 10, 2023, Quanci et al.
U.S. Appl. No. 18/511,148, filed Nov. 16, 2023, Quanci et al.
U.S. Appl. No. 18/511,621, filed Nov. 16, 2023, Quanci et al.
U.S. Appl. No. 18/584,320, filed Feb. 22, 2024, West et al.
U.S. Appl. No. 18/586,236, filed Feb. 23, 2024, Quanci et al.
"ASBESTOS", Virginia Department of Health, https://www.vdh.virginia.gov/environmental-health/public-health-toxicology/asbestos/, updated 2023, 2 pages.
Item HT 56107 Briquette, 'H' Type Household or Domestic Use, SECV Brown Coal Mine, Yallourn, Victoria, circa 1925, Museums Victoria Collections, https://collections.museumsvictoria.com.au/items/2286568, published on Mar. 2, 2021; 3 pages.
"Ceramic fibers wool—to 1,3000C", gTeek, Dec. 29, 2017 (date obtained from google search tools), https://www.gteek.com/ceramic-fibers-woolp-to1-300-%C2%BOC, 15 pages.
Chaudhari, K., Cupola Furnace, engineersgalary.com Jan. 24, 2016; 4 pages.
"How Glass Is Made," Corning, https://www.corning.com/worldwide/en/innovation/materials-science/glass/how-glass-made.html, 2 pages.

(56) References Cited

OTHER PUBLICATIONS

Ishiwata, et al. "Effect of coke diameter and oxygen concentration of blast on cupola operation." ISIJ International, 2011, vol. 51, pp. 1353-1359.

Ivanova, V. A. "Analysis of the requirements for foundry coke." IOP Conference Series: Materials Science and Engineering, 2020, vol. 986, pp. 1-6.

Kusiorowski, et al., "Thermal decomposition of different types of abestos," Journal of Thermal Analysis and Calorimetry • Feb. 2012, 109, 693-704 (2012).

Lin, Rongying et al., "Study on the synergistic effect of calcium and aluminum on improving ash fusion temperature of semi-coke," International Journal of Coal Preparation and Utilization, May 31, 2019 (published online), vol. 42, No. 3, pp. 556-564.

Office of the Federal Register, National Archives and Records Administration. (Apr. 14, 2005). 70 FR 19992—National Emission Standards for Coke Oven Batteries. [Government]. Office of the Federal Register, National Archives and Records Administration. https://www.govinfo.gov/app/details/FR-2005-04-15/05-6942.

Pearson, D.E., "Influence of Geology on CSR (Coke Strength After Reaction with C02)," 2009, 8 pages.

Powell, et al. "Cupola Furnaces", ASM International, downloaded from http://dl.asminternational.org/handbooks/edited-volume/chapter-pdf/501030/a0005197.pdf; 9 pages.

U.S. Appl. No. 18/770,274, filed Jul. 11, 2024, Quanci et al.

U.S. Appl. No. 18/793,631, filed Aug. 2, 2024, Quanci et al..

U.S. Appl. No. 18,892,228, filed Sep. 20, 2024, Quanci et al.

Schlueter, R. "What's so good about coke made from coal, Aug. 29, 2016," Belleview News-Democrat, Rschuleter@bnd.com; 4 pages.

Seal School, Coal v. Coke|Fast differences and Comparison. Viewable on YouTube (Year:2020).

\* cited by examiner

| Id | Oven Model | Age | Production Rate | Coking Rate | Remaining Life |
|---|---|---|---|---|---|
| D01 | Model 1 | 10 yrs. | 0.82 | 0.84 | 10 yrs. |
| D05 | Model 1 | 12 yrs. | 0.75 | 0.77 | 9 yrs. |
| D07 | Model 3 | 11 yrs. | 0.71 | 0.74 | 5 yrs. |
| D08 | Model 4 | 8 yrs. | 0.94 | 0.92 | 20 yrs. |
| D15 | Model 1 | 15 yrs. | 0.52 | 0.50 | 7 yrs. |

| Data Set/Quality | Target | Current | Prior 1 | Prior 2 | Prior 3 | Average | Trend |
|---|---|---|---|---|---|---|---|
| End C/S Temperature (F) | 1900 | N/A | 1978 | 2030 | 1711 | 1907 | |
| End P/S Temperature (F) | 1900 | N/A | 1949 | 2044 | 1943 | 1979 | |
| End Crown Temperature | 2200 | N/A | 2202 | 2239 | 2275 | 2238 | |
| Average C/S Temperature (F) | 2100 | N/A | 2176 | 2159 | 2204 | 2196 | |
| Average P/S Temperature (F) | 2100 | N/A | 2120 | 2122 | 2088 | 2110 | |
| Average Crown Temperature (F) | 2300 | N/A | 2119 | 2075 | 2081 | 2105 | |
| Peak C/S Temp After Push (F) | 2400 | 2178 | 2512 | 2346 | 2236 | 2373 | |
| Peak P/S Temp After Push (F) | 2400 | 2292 | 2382 | 2147 | 2312 | 2280 | |
| Peak Crown Temperature (F) | 2400 | N/A | 2479 | 2357 | 2316 | 2384 | |
| Time at Peak Crown Temperature (hours) | 35 | 10 | 56 | 32 | 41 | 43 | |
| Min C/S Temp After Push (F) | 2300 | 2179 | 2512 | 2368 | 2238 | 2373 | |
| Min P/S Temp After Push (F) | 2300 | 2282 | 2304 | 2146 | 2295 | 2248 | |
| Delta Between Peak and Min C/S (F) | 260 | 0 | 0 | 0 | 0 | 0 | |
| Delta Between Peak and Min P/S (F) | 300 | 10 | 78 | 1 | 17 | 32 | |
| Cycle Time (hours) | 49 | N/A | 62.2 | 47.1 | 49.5 | 53 | |
| Coking Time (hours) | 47 | N/A | 58.1 | 46.8 | 48.5 | 51 | |
| Charge Weight (Tons) | 38 | 37.0 | 36.9 | 36.9 | 35.9 | 37 | |
| Average Draft at the stack | -0.30 | N/A | -0.35 | -0.35 | -0.36 | -0.36 | |
| Average Oxygen at the HRSG | 11.00 | N/A | 10.01 | 10.01 | 10.01 | 10.01 | |

FIG. 9

Figure 10:
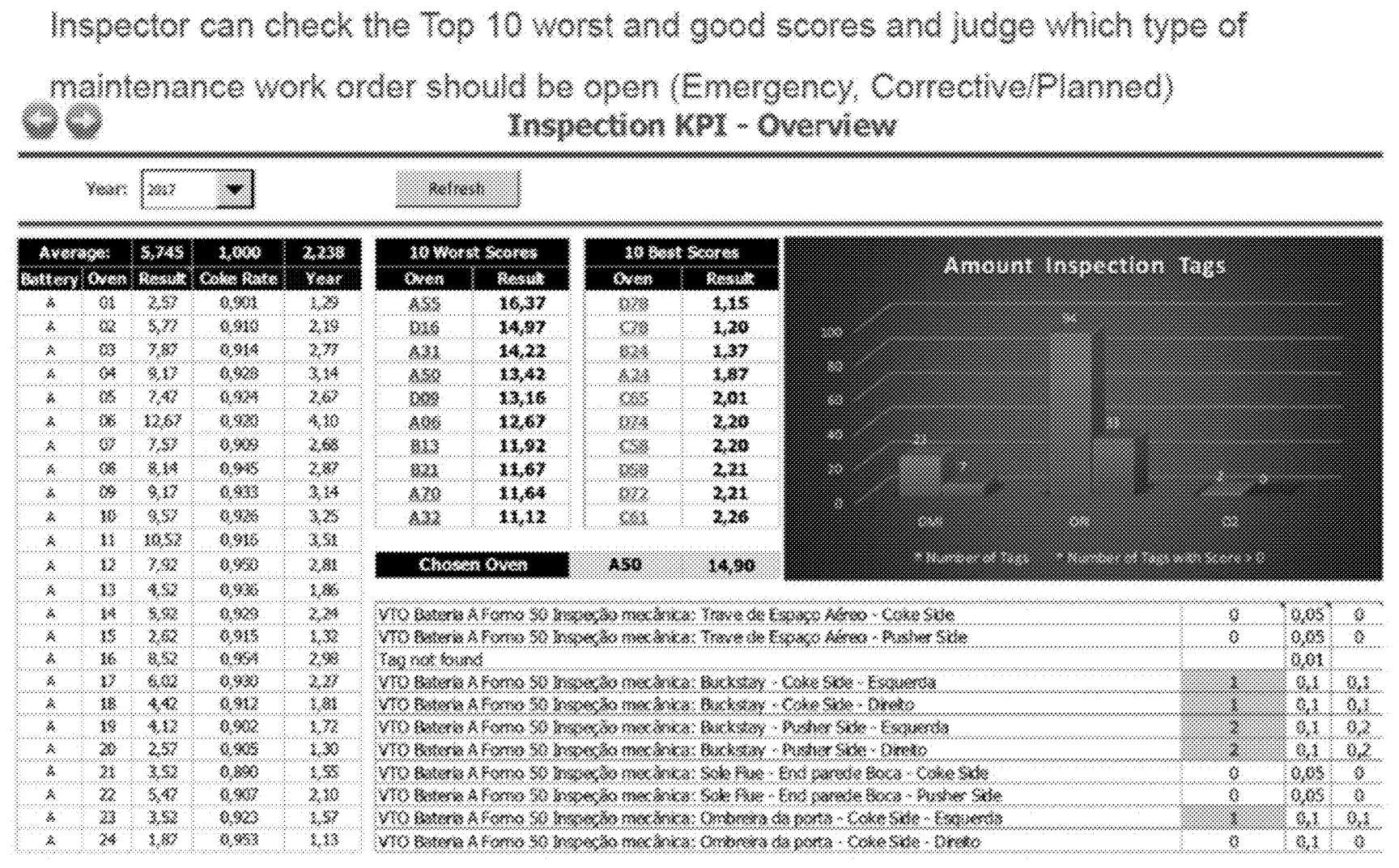

Inspector can check the Top 10 worst and good scores and judge which type of maintenance work order should be open (Emergency, Corrective/Planned)

Inspection KPI - Overview

Summary of MTO Mechanical Inspection Battery Conditions

| | Most Severe | Moderate Severity | Least Severe |
|---|---|---|---|
| Air Space Beams Grade Definitions: | Grade 3 Collapsed | Grade 2 Heat Stress | Grade 1 Needs Cleaning |
| Buckstay, End Wall Beam, Jamb plate, sill beam and Lintel Plate Grade Definitions: | Grade 3 Severe Damage | Grade 2 Moderate Damage | Grade 1 Minimum Damage |
| Bench Grade Definitions: | Grade 3 N/A | Grade 2 Replace | Grade 1 Repair |
| Door Grade Definitions: | Grade 3 Replace | Grade 2 Frame Damage or Hole in Steel | Grade 1 Missing Latches or Hot Spot |
| Tie Rod Grade Definitions: | Grade 3 No Tie Rod Spring | Grade 2 Broken or Missing Tie Rod | Grade 1 Bent Tie Rod |

*FIG. 13D*

OVEN HEALTH OPTIMIZATION SYSTEMS AND METHODS

CROSS-REFERENCE TO RELATED APPLICATION(S)

The present application claims the benefit of priority to U.S. Provisional Patent Application No. 62/953,817, filed on Dec. 26, 2019, the disclosure of which is incorporated herein by reference in its entirety.

TECHNICAL FIELD

The present technology relates to coke ovens and in particular to systems and methods for optimizing the health and operations of coke ovens.

BACKGROUND

Coke is a vital component in the blast furnace production of steel. Coke is a solid carbon fuel and carbon source used to melt and reduce iron ore in the production of steel. Coke plants typically produce millions of tons of coke each year. The coke making process begins by receiving and charging metallurgical coal into ovens (using, for example, a levelling conveyer). The ovens heat up the coal to high temperatures (e.g., 2000° F.), which causes the volatile matter to be released, captured, and burned off. This in turn keeps the bricks hot. Gases from the combustion are then drawn into openings in the oven walls, called downcomers, and are thermally destroyed as they mix with air and circulate in the sole flues beneath the oven floor. This heats the oven from below so that the coal is heated at an even rate between the top and bottom. Because the production of coke is a batch process, multiple coke ovens are operated simultaneously. To ensure that the coking rate is consistent throughout all of the ovens in a plant and to ensure that the quality of coke remains consistent between batches, the operating conditions of the coke ovens are closely monitored and controlled.

At the end of a coking cycle, the coke gets pushed out of the oven by a pusher-charger machine and on to a hot car to make room for a new charge. Once on the hot car, the coke is transported the length of the ovens for further processing. For instance, the coke is transported to a quench tower for quenching operations. In the quench tower, the coke is cooled off (e.g., using water released through a spray nozzle). The coke is then deposited to a wharf. Once cooled, the coke is then delivered to end users.

Coke making is a very expensive process, where multiple coke manufacturers are competing to manufacture the highest quality coke while optimizing the operations costs, optimizing environmental impacts, and maximizing energy efficiency. As such, ensuring reliable operation of coke oven gas plants is more important than ever in securing a stable supply of clean fuel for a manufacturers end users (e.g., steelworks). Thus, the need exists for efficient coke making processes, and specifically for processes that optimize the health and operations of the coke making ovens to produce the highest quality coke while optimizing their environmental impacts.

BRIEF DESCRIPTION OF THE DRAWINGS

FIG. 5 is a table diagram showing sample contents of an oven data table.

FIGS. 6-12 are example reports for visualizing various parameters and optimization results for ovens.

FIGS. 13A-13C are example reports for visualizing various inspection parameters for ovens.

FIG. 13D illustrates an example summary report of mechanical inspection battery conditions.

Figure 1:
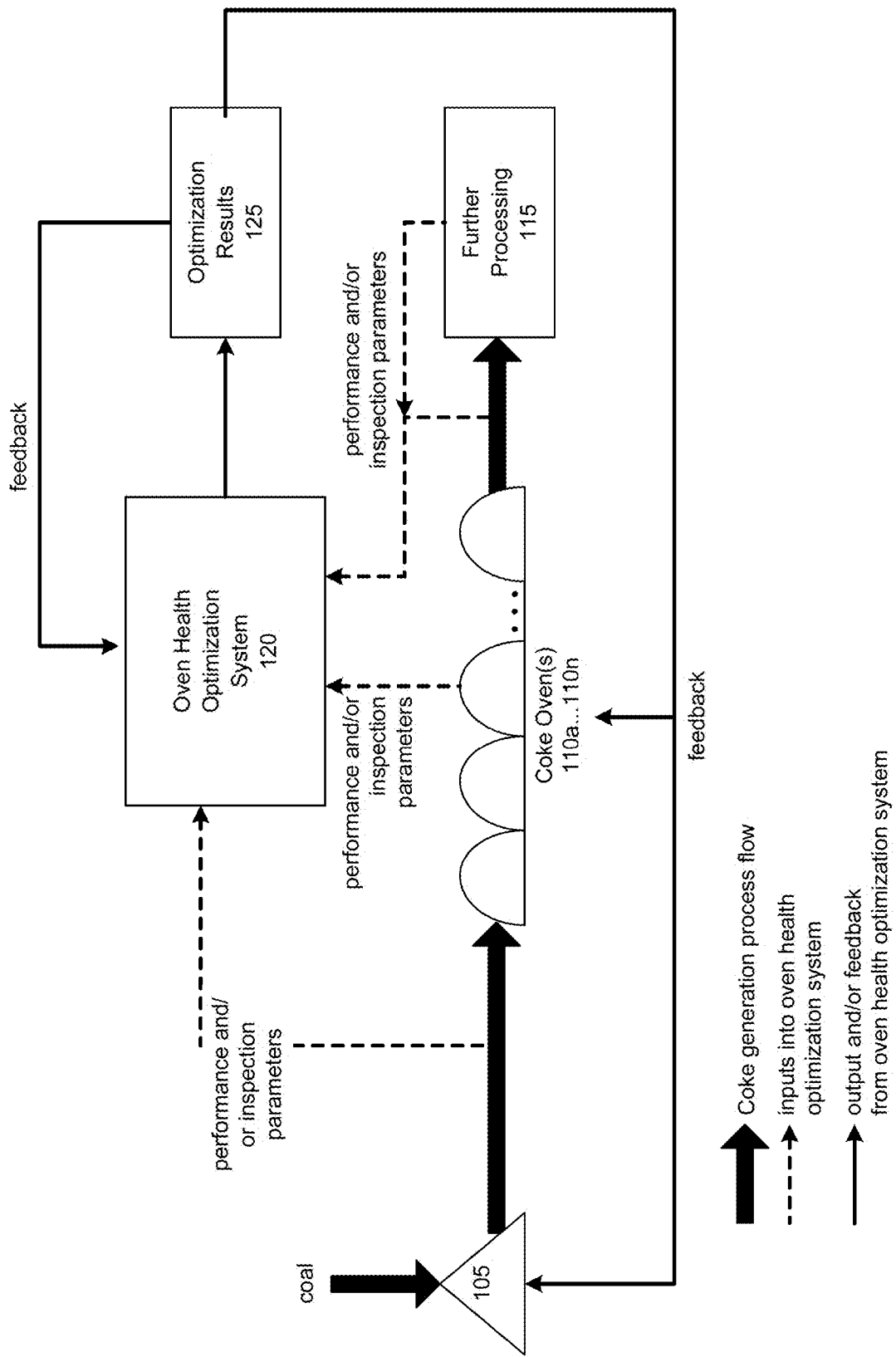
FIG. 1 is a block diagram illustrating an environment within which to optimize oven health performance.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

As discussed above, for coke manufacturers to stay competitive and profitable, it is imperative that they optimize their coke making operations. To do so, coke manufacturers have to constantly monitor the battery of coke ovens and constantly design/redesign, configure, and/or modify their coke making process. In particular, coke manufacturers need to ensure that each of their coke ovens is producing coke in a most efficient manner and not burdening other ovens in the battery of coke ovens. Since coke ovens tend to be very expensive, it is also imperative that the coke ovens be regularly maintained and repaired, as well as identified for retirement (e.g., when their repair/maintenance costs exceed their replacement costs).

To solve these and other problems, the inventors have developed an overall oven health optimization system ("oven health optimization system") and method to compute one or more metrics to measure/compare oven health performance data, compute oven life indicator values, generate one or more oven health performance plans, and so on, based on oven operation and/or inspection data.

Specific details of several embodiments of the disclosed technology are described below with reference to a particular, representative configuration. The disclosed technology can be practiced in accordance with ovens, coke manufacturing facilities, and insulation and heat shielding structures having other suitable configurations. Specific details describing structures or processes that are well-known and often associated with coke ovens but that can unnecessarily obscure some significant aspects of the presently disclosed technology are not set forth in the following description for clarity. Moreover, although the following disclosure sets forth some embodiments of the different aspects of the disclosed technology, some embodiments of the technology can have configurations and/or components different than those described in this section. As such, the present technology can include some embodiments with additional elements and/or without several of the elements described below with reference to FIGS. 1-13D.

The phrases "in some implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

FIG. 1 is a block diagram illustrating how an environment within the oven health optimization system operates. A coke generation process flow begins when coal is received and collected at one or more receptacles 105. Once a sufficient quantity and quality of coal is received and collected, it is then fed to one or more coke ovens 110a ... 110n. Typically, a coke generation plant operates a battery of coke ovens, arranged in a preconfigured manner, to produce a desired quantity of coke. In several implementations, the coke ovens are non-recovery ovens and/or heat-recovery ovens, which produce higher quality coke, using waste heat to generate derivative energy for resale, and reducing environmental impact. The coke generated by the coke ovens can then be subjected to further processing 115 (e.g., quenching operations). As the coal is fed to the coke ovens, as the ovens are operated, or as further post-processing occurs, values of one or more performance parameters and/or inspection parameters can be gathered and sent to an oven health optimization system 120. Examples of performance parameters include, but are not limited to, one or more of the following: production rate, oven health score, current spend on repairs, clinker amount, coke production over time, coking rate, surface losses, heat released, air leakage, output coke properties, draft, draft at the vent stack, draft at the end and mid ovens, draft loss per oven, oxygen levels, inlet temperature to the heat recovery steam generator (HRSG), leak rates from helium leak test (as described in U.S. patent application Ser. No. 16/729,201, which is incorporated in its entirety herein), temperature profile of coking cycle (crown temperature, sole flue temperature, etc.), and so on. Values for the performance parameters can be sent as they are generated (in real time, e.g., seconds, minutes, etc.) and/or in an aggregated manner (in real time or intermittently, e.g., days, weeks, etc.).

Values for the inspection parameters can be gathered using one or more of the following categories of inspection: mechanical inspections, refractory inspections, and oven oxygen reading. Mechanical inspections include, for example, thermography (e.g., boiler ceiling, common tunnel, and crossover), topography battery, door/lintel/jamb inspection, inspection tie rods and springs, inspection buckstay, inspection transition box/elbow, inspection air space, and so on. Refractory inspections include, for example, oxygen measurement inspection, sole flue inspection, oven chamber inspection (e.g., via photography), carbon inspection, oven refractory exterior, and so on. Examples of inspection parameters include, but are not limited to, one or more of the following: configuration of at least one heat-recovery coke oven, age of the at least one heat-recovery coke oven, condition of the at least one heat-recovery coke oven, maintenance records of the at least one heat-recovery coke oven, operation data of the at least one heat-recovery coke oven, repair status of the at least one heat-recovery coke oven, burners used, coal properties, regulatory compliance requirements, soak time, ambient conditions, logistical parameters, mechanical production parameters, helium detection, damper block condition, leaks, severity of operation, number of cycles, fissure line formation, mass flow rate, burn loss, power production, complete coking time, elapsed coking time, cycle length, cycle time, crown temperature, coke-side temperature, pusher-side temperature, sole flue temperature (e.g., end sole flue coke time temperature, end sole flue push side temperature), sole flue (SF) peak temperature, draft, SF peak time, first crossover time, last crossover time, crown peak time, position control scheme, charge weight, wharf performance, burner feedback, door fires, lance usage, uptake, oxygen intake, downtime, measuring smell and chemicals outside the plant (for example, as described in U.S. Patent Application No. 62/345,717, which is incorporated in its entirety herein), and so on.

Figure 13A:
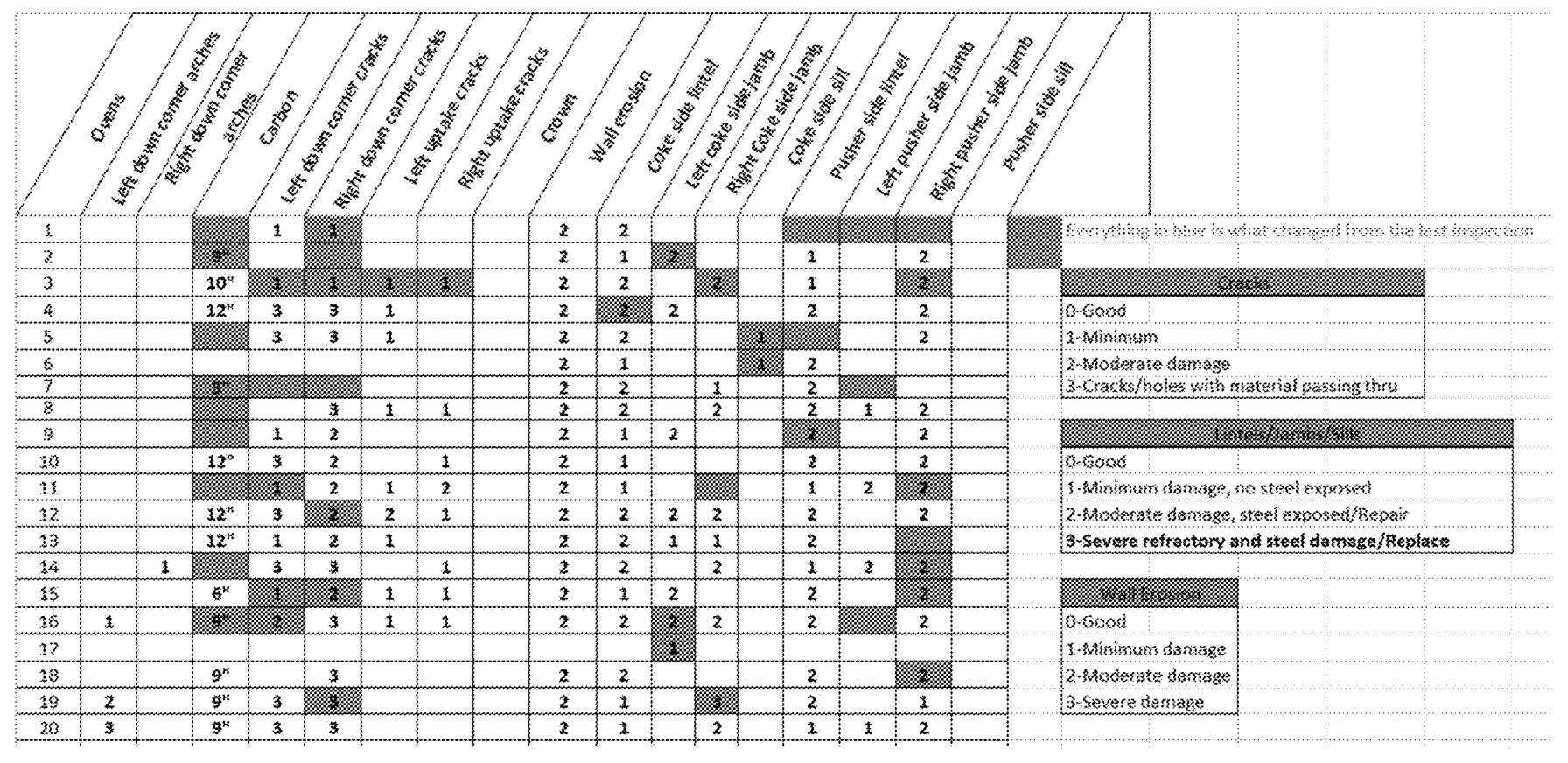
Figure 13B:
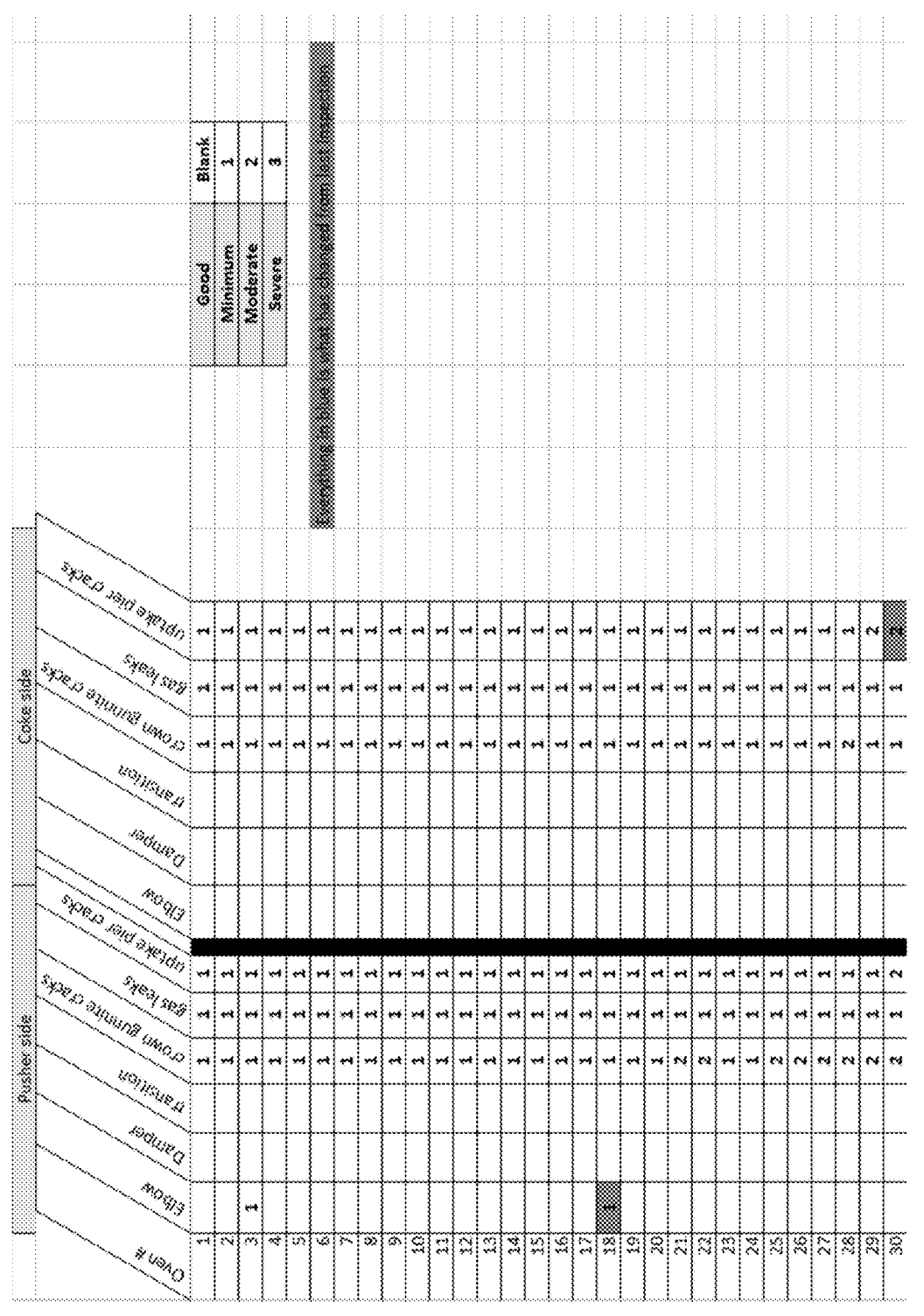
Figure 13C:
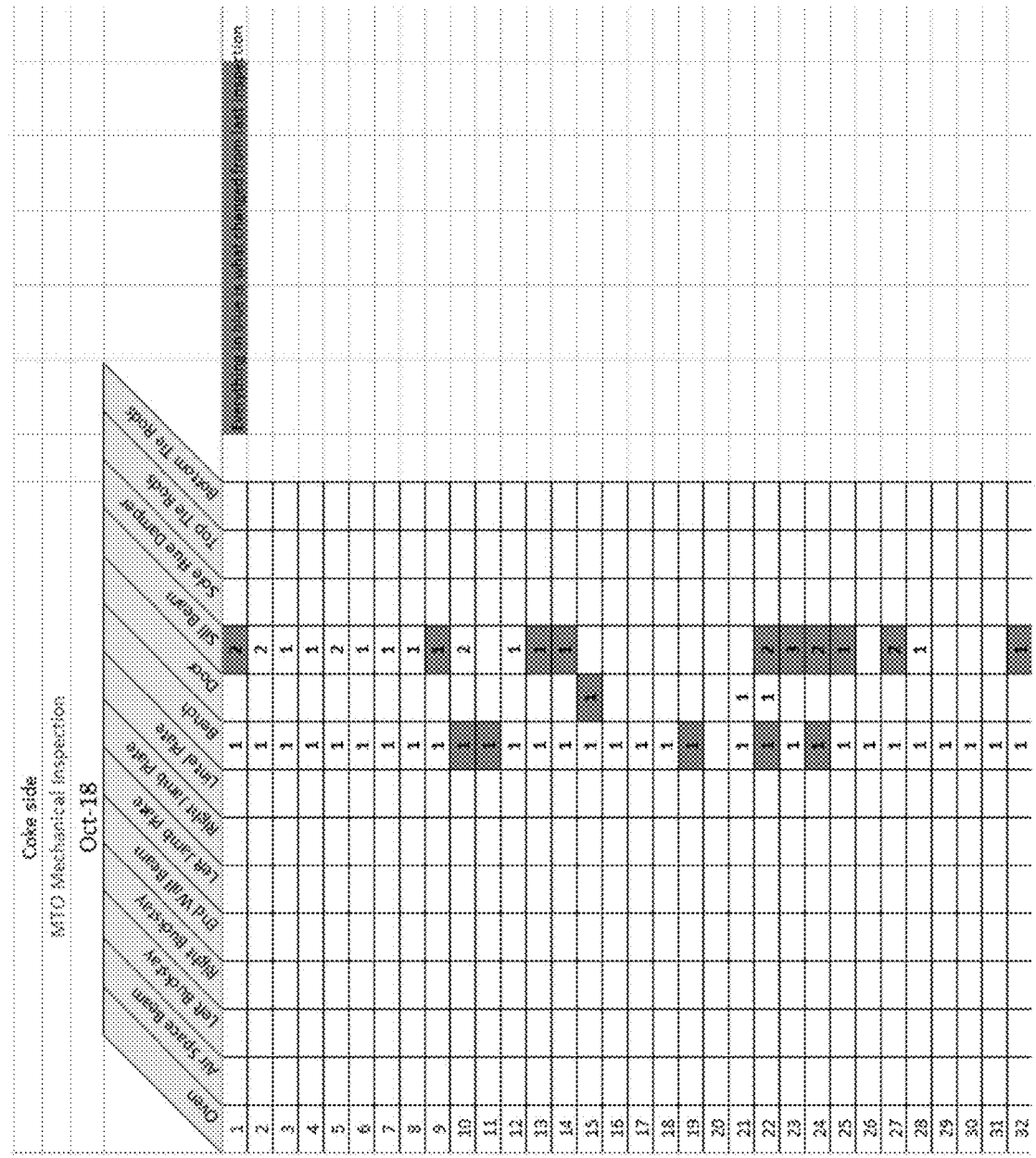

In several implementations, online (and/or real-time) inspection data is combined with off-line (and/or non-real-time) inspection data to compute oven life. Examples of off-line (and/or non-real-time) inspection data include data collected by inspections done by inspectors. For example, off-line (and/or non-real-time) inspection data comprises oven chamber inspection data, oven crown inspection data, oven mechanical inspection data, and so on. Oven chamber inspection data comprises data related to left downcomer arches, right downcomer arches, carbon, left downcomer cracks, right downcomer cracks, left uptake cracks, right uptake cracks, crown, wall erosion, coke side lintel, left coke side jamb, right coke side jamb, coke side sill, pusher side lintel, left pusher side jamb, right pusher side jamb, pusher side sill, and so on (see FIG. 13A for examples). Examples of oven crown inspection data comprise data related to coke side and/or pusher side elbow damper, transition, crown gunnite cracks, gas leaks, uptake pier cracks, and so on (see FIG. 13B for examples). Oven mechanical inspection data comprises data related to coke side and/or pusher side air space beam, left buckstay, right buckstay, end wall beam, left jamb plate, right jamb plate, lintel plate, bench, door, sill beam, sole flue damper, top tie rods, bottom tie rods, and so on (see FIG. 13C for examples). FIG. 13D illustrates an example summary report of mechanical inspection battery conditions.

The oven health optimization system 120 can receive this data at various frequencies and/or granularities. For example, the oven health optimization system 120 can receive real-time data (e.g., represented in seconds), near-term data (e.g., represented in days), inspection data (typically generated/stored at a frequency of 4-6 months), survey data (typically generated or stored at a frequency of months or years), and so on. The oven health optimization system 120 can process this wide variety of data, received and/or stored at different frequencies, to compute values of one or more oven optimization results 125. In several implementations, the optimization results 125 are fed back to enhance/optimize one or more aspects of the coke generation process (as discussed in more detail below).

FIG. 1 and the discussion herein provide a brief, general description of a suitable environment in which the oven health optimization system 120 can be supported and implemented. Although not required, aspects of the oven health optimization system 120 are described in the general context of computer-executable instructions, such as routines executed by a computer (e.g., mobile device, a server computer, or personal computer). The system can be practiced with other communications, data processing, or computer system configurations, including Internet appliances, hand-held devices (including tablet computers and/or personal digital assistants (PDAs)), Internet of Things (IoT) devices, all manner of cellular or mobile phones, multiprocessor systems, microprocessor-based or programmable consumer electronics, set-top boxes, network PCs, minicomputers, mainframe computers, and the like. Indeed, the terms "computer," "host," "host computer," "mobile device," and "handset" are generally used interchangeably herein and refer to any of the above devices and systems, as well as any data processor.

Aspects of the system can be embodied in a special-purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer-implemented instructions, data structures, screen displays, and other data under aspects of the system can be distributed over the Internet or over other networks (including wireless networks), on a propagated signal on a propagation medium (e.g., an electromagnetic wave(s), a sound wave(s), etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In alternative implementations, the mobile device or portable device can represent the server portion, while the server can represent the client portion.

Figure 2:
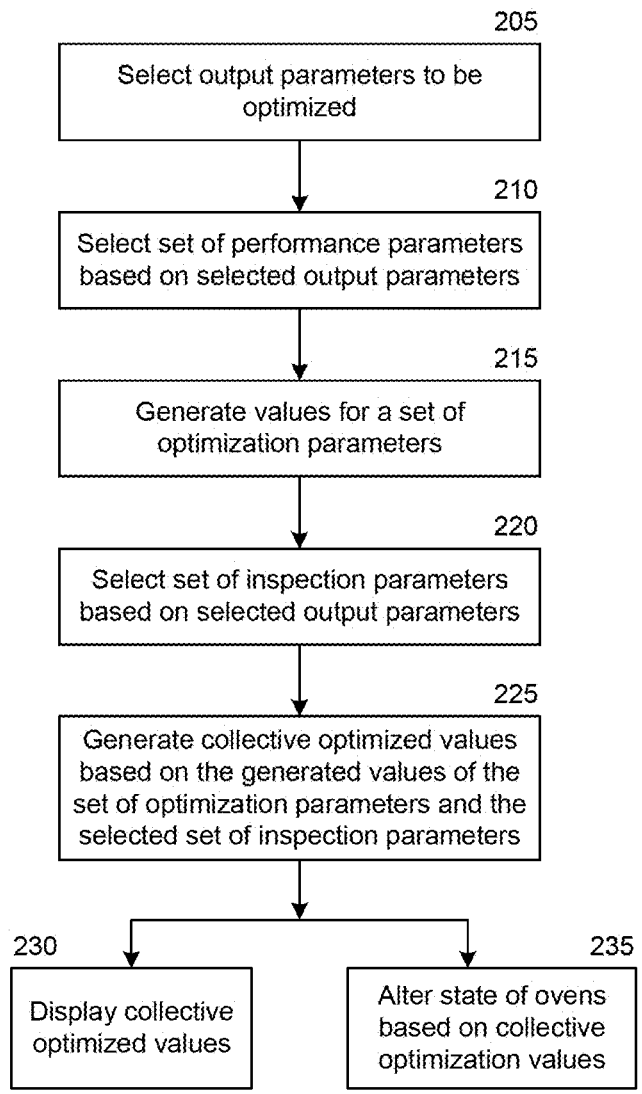
FIG. 2 is a flow diagram illustrating a process of optimizing oven health performance.

Further details regarding the operation and implementation of the oven health optimization system 120 will now be described. FIG. 2 is a flow diagram illustrating a process 200 of optimizing oven health performance performed by the oven health optimization system 120. Process 200 begins at block 205 by receiving a selection of at least one output parameter to be optimized. The output parameters can reflect one or more measurements of oven profitability. Examples of the output parameters include, but are not limited to, one or more of the following: return on investment (ROI) on repair of at least one heat-recovery coke oven, coke production over time, coking rate, cost to repair the at least one heat-recovery coke oven, cost to rebuild the at least one heat-recovery coke oven, cost to abandon the at least one heat-recovery coke oven, profitability of the at least one heat-recovery coke oven, remaining life of the at least one heat-recovery coke oven, damage to the at least one heat-recovery coke oven, rate of aging, aging as a function of tons run through the at least one heat-recovery coke oven, aging as a function of the operating conditions in the at least one heat-recovery coke oven, closing gain, opening gain, damage score, environmental score, permit requirements, output quality, power production, and so on.

At block 210, process 200 selects one or more key performance indicators or KPIs from a set of performance parameters (discussed above) based on the selected output parameter(s). For example, based on the specific output parameter selected to be optimized, process 200 can determine one or more strongly correlated performance parameters (KPIs) that are most pertinent to the selected output parameter. In several implementations, process 200 can select the KPIs from a larger set of available performance indicators, each of which provides an indication of how the coke ovens are operating/performing. The KPI values can be per oven and/or per set of ovens.

Figure 6:
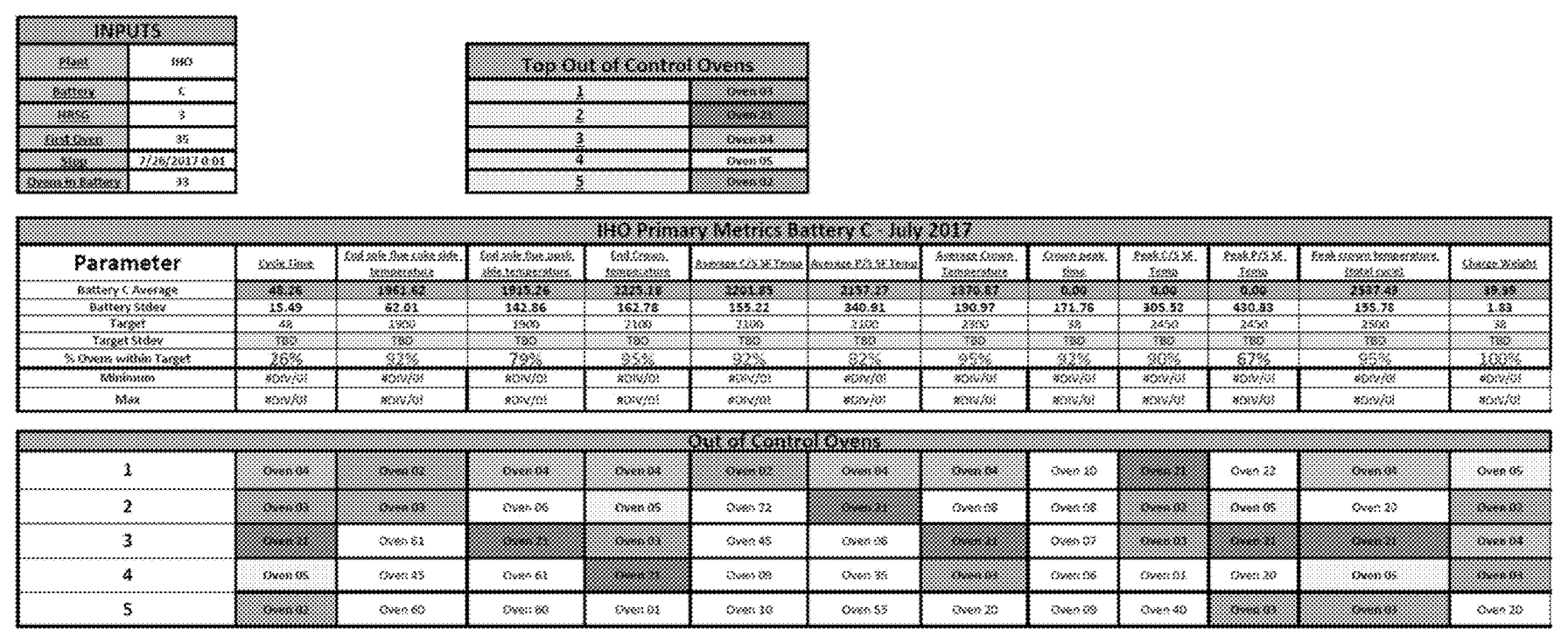
Figure 7:
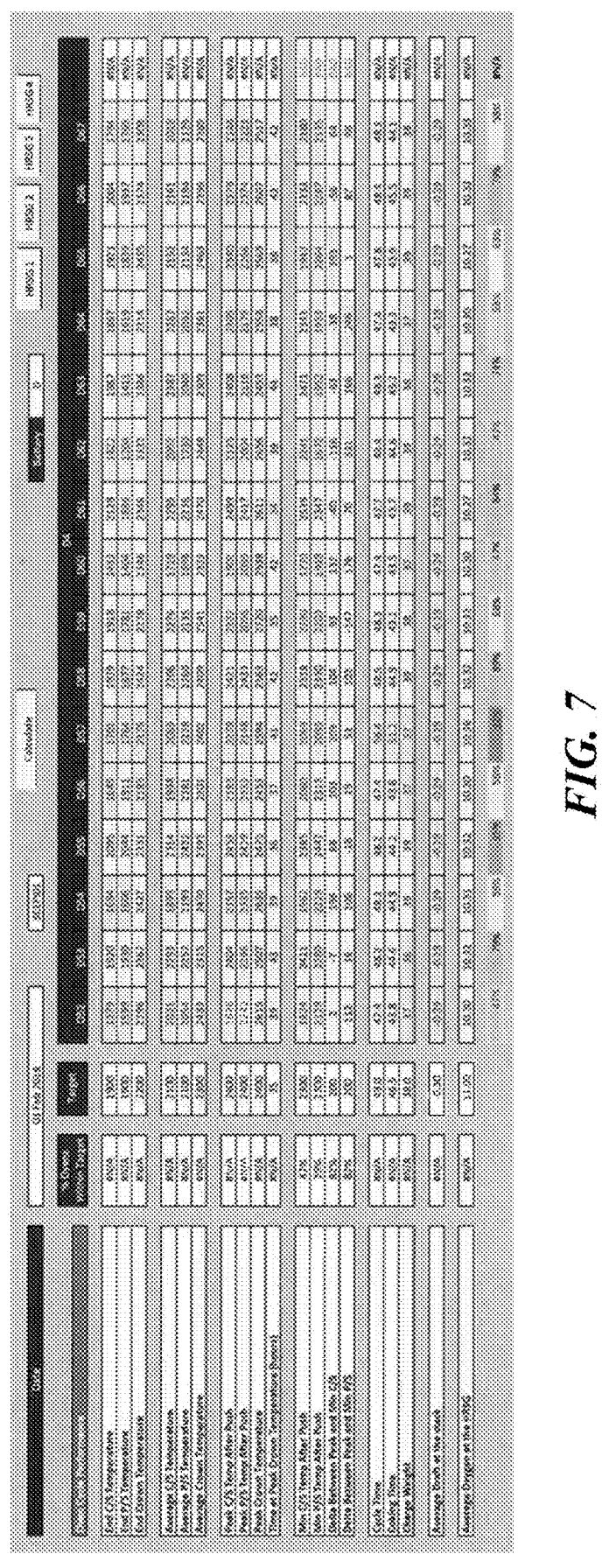
Figure 9:
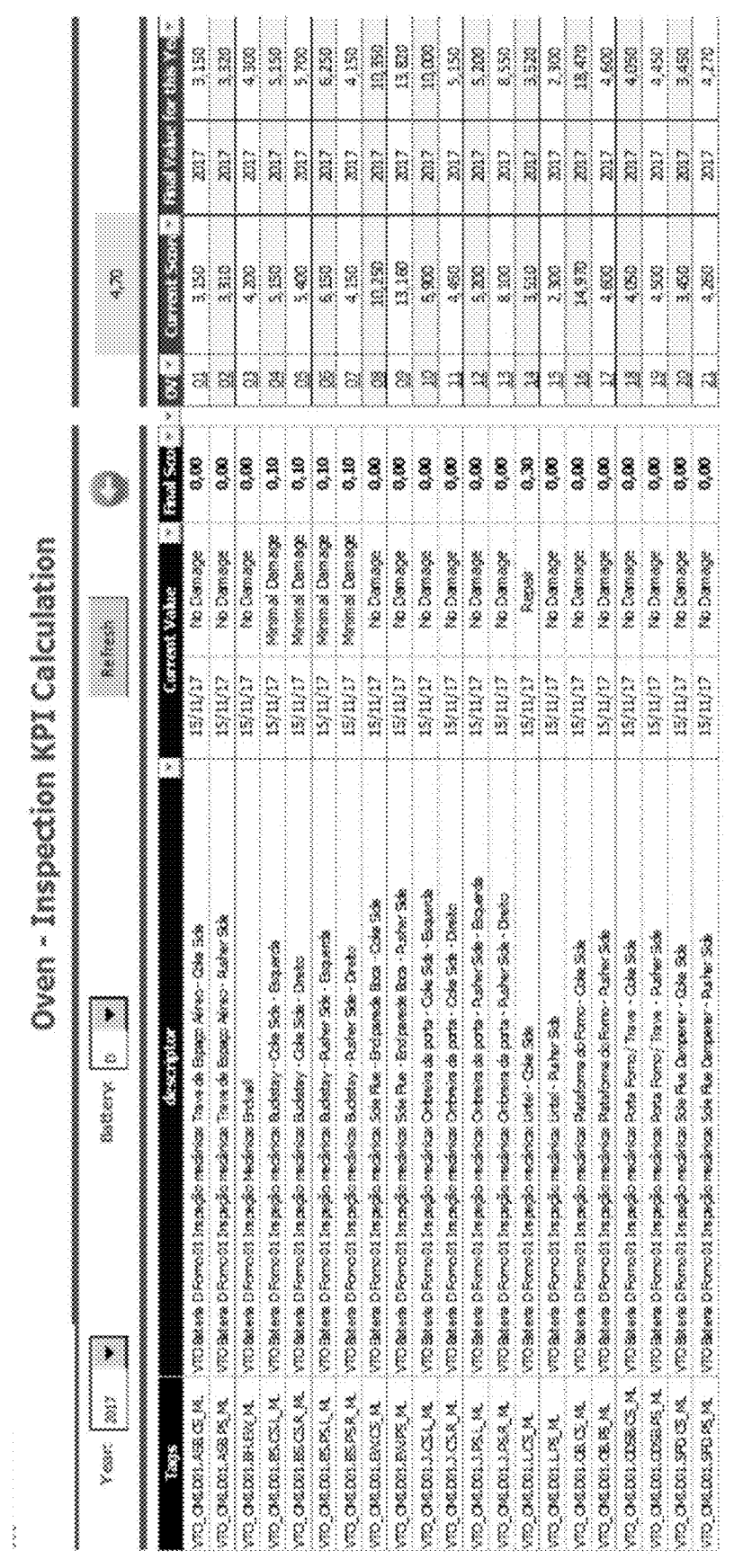
Figure 11:
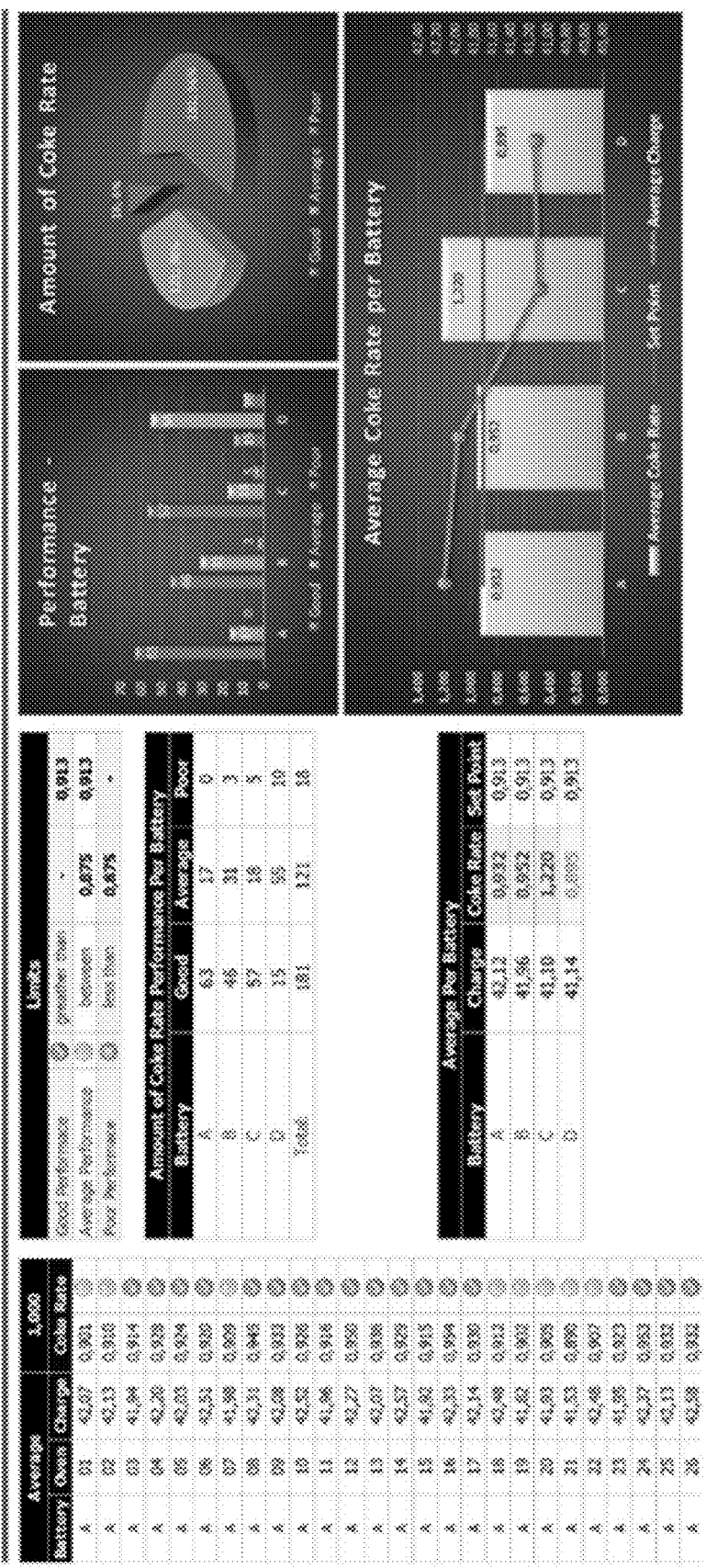
Figure 12:
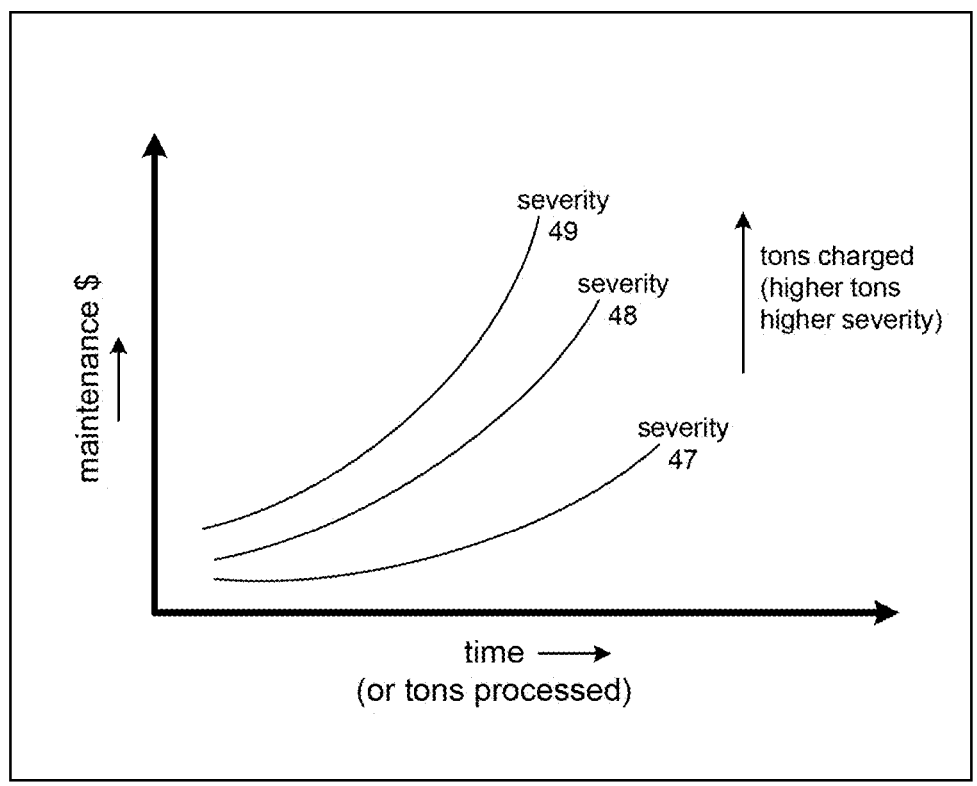

In several implementations, process 200 selects the KPIs based on knowledge of oven operation. Process 200 can maintain and access a correlation between the output parameters and the performance indicators to select the top n indicators as KPIs. For example, process 200 evaluates soak time as an important parameter. The soak time is a function of the charge, the crown and sole temperatures, and coke rate—consequently, process 200 selects one or more of the temperatures and the temperature profile. FIGS. 6 and 7 illustrate an example where correlation of parameters is used to evaluate oven performance. As illustrated in FIGS. 6 and 7, each parameter is associated with a target range. Each oven is evaluated based on the values of its parameters falling within their respective ranges. Then all parameters within the range are consolidated (e.g., by summing up their values). As more data is collected, process 200 can reevaluate the ranges, and then redo the correlation. As another example, FIGS. 9, 10, and 11 illustrate the use of a complex correlation that combines online oven health with quarterly inspection to give a ranking. This can then be correlated to oven health and age.

At block 215, process 200 generates values for a set of operation optimization parameters using values of the set of selected performance parameters. The set of operation optimization parameters can be selected from a larger set based on the selected output parameter to be optimized. Examples of optimization parameters include, but are not limited to, one or more of the following: coke push grade, soak time, environmental factors, oven performance, quality, yield, rate, power, and so on. For example, an important optimization parameter is the coke production rate (i.e., tons of coke/hour). The coke production reflects the existing current operation and health. If an oven is running well, it will have a higher coke production rate. The coke production rate is then mixed with the oven inspection, which is more of a long-term health factor. A combination of current operating performance and inspection leads to the ability to predict current oven life, and from that, current and future repair costs can be estimated.

At block 220, process 200 selects a set of inspection parameters (discussed above) based on the selected output parameter(s) (selected at block 205). For example, based on the specific output parameter selected to be optimized, process 200 can determine one or more strongly correlated inspection parameters that are most pertinent to the selected output parameter. In several implementations, process 200 can select the inspection parameters from a larger set of available inspection indicators, each of which provide an indication of how the coke ovens are operating/performing.

In several implementations, by reviewing many process parameters, process 200 can statistically determine the important process parameters to monitor. For example, when the main output is production and oven life, process 200 can monitor the tons of coke/hour, oven temperatures, soak time, push quality, and the oven inspection to determine when an oven is running well and its expected life. This information can then be used to determine what repairs are needed. This process can be reconfigured by reevaluating the process parameters and changing the weighting. For example, process 200 can evaluate the soak time. An oven with a short soak time in general will have an issue. This typically will then lead to also looking at the oven peak and average temperatures. Short soak time, at normal charges and low oven temperatures, means poor oven operation, leaks, or poor draft. This then allows process 200 to determine whether these are also present and comes into an oven having a poor score in all these areas. Process 200 can then hook this to an advisory system that can advise options such as repairs and operator actions.

In several implementations, process 200 can compute values for composite oven inspection KPIs by, for example, selecting two or more inspection parameters and computing a weighted average of their respective values. For example, a composite oven inspection KPI can be calculated by adding all the values from the multiplication of the inspection tag and the respective weights:

| Tags | English | % Weighting |
| --- | --- | --- |
| VTO_OMI.A01.ASB.CS_ML | VTO Battery A Oven 01 Mechanical Inspection: Air Space Beam - Coke Side | 0.050 |
| VTO_OMI.A01.ASB.PS_ML | VTO Battery A Oven 01 Mechanical Inspection: Air Space Beam - Pusher Side | 0.050 |
| VTO_OMI.A01.BH.EW_ML | VTO Battery A Oven 01 Mechanical Inspection: Bulkhead Endwall | 0.010 |
| VTO_OMI.A01.BS.CS.L_ML | VTO Battery A Oven 01 Mechanical Inspection: Buckstay - Coke Side - Left | 0.100 |
| VTO_OMI.A01.BS.CS.R_ML | VTO Battery A Oven 01 Mechanical Inspection: Buckstay - Coke Side - Right | 0.100 |
| VTO_OMI.A01.BS.PS.L_ML | VTO Battery A Oven 01 Mechanical Inspection: Buckstay - Pusher Side - Left | 0.100 |
| VTO_OMI.A01.BS.PS.R_ML | VTO Battery A Oven 01 Mechanical Inspection: Buckstay - Pusher Side - Right | 0.100 |
| VTO_OMI.A01.EW.CS_ML | VTO Battery A Oven 01 Mechanical Inspection: Sole Flue - End Wall Beam - Coke Side | 0.050 |
| VTO_OMI.A01.EW.PS_ML | VTO Battery A Oven 01 Mechanical Inspection: Sole Flue - End Wall Beam - Pusher Side | 0.050 |
| VTO_OMI.A01.J.CS.L_ML | VTO Battery A Oven 01 Mechanical Inspection: Jamb - Coke Side - Left | 0.100 |
| VTO_OMI.A01.J.CS.R_ML | VTO Battery A Oven 01 Mechanical Inspection: Jamb - Coke Side - Right | 0.100 |
| VTO_OMI.A01.J.PS.L_ML | VTO Battery A Oven 01 Mechanical Inspection: Jamb - Pusher Side - Left | 0.100 |
| VTO_OMI.A01.J.PS.R_ML | VTO Battery A Oven 01 Mechanical Inspection: Jamb - Pusher Side - Right | 0.100 |
| VTO_OMI.A01.L.CS_ML | VTO Battery A Oven 01 Mechanical Inspection: Lintel - Coke Side | 0.150 |
| VTO_OMI.A01.L.PS_ML | VTO Battery A Oven 01 Mechanical Inspection: Lintel - Pusher Side | 0.150 |
| VTO_OMI.A01.OB.CS_ML | VTO Battery A Oven 01 Mechanical Inspection: Oven Bench - Coke Side | 0.010 |

The weighted values in the above example are the inspection monitoring health parameters. The weighted score for the inspection parameters is added to the current oven operational score that looks at the current oven operation and/or last several cycles of oven operation. These two values are then put into a correlation that predicts the current oven life. This indicates what extra work is needed on the oven as well as the existing life of the oven. By doing more work on an oven, the oven life can be further improved. Consequently, this indicates which ovens need the most work to regain the oven life.

At block 225, process 200 generates collective optimized values based on the generated values of the set of optimization parameters and the selected set of inspection parameters. The collective optimized values can be generated per oven and/or per set of ovens. Examples of optimized values include, but are not limited to, one or more of the following: oven life indicator value, oven repair plan, and so on. For example, as part of the oven repair plan, process 200 can set a priority of repair for the ovens. To do so, process 200 generates oven life indicator values for a set of ovens using generated values for the set of operation optimization parameters for the set of ovens and values of the selected set of inspection parameters for the set of ovens. Then process 200 generates a priority of repair for ovens in the set of ovens by comparing the generated oven life indicator values for the set of ovens (e.g., ovens with lower life indicator values are prioritized higher for replacement/repair).

In several implementations, process 200 receives values of historical trends parameters from a set of historical trends parameters related to the ovens. For example, process 200 receives historical values of one or more performance and inspection parameters for a certain time period (e.g., last month, last year, etc.). Process 200 can then revise the generated collective optimized values (e.g., the oven life indicator value, the oven repair plan, or both) by subjecting a subset of the values of the historical trends parameters to a historical trends model.

In several implementations, process 200 receives values of miscellaneous parameters from a set of miscellaneous parameters related to the ovens. Examples of miscellaneous parameters include, but are not limited to, one or more of the following: cost to repair oven, cost to rebuild oven, cost to abandon oven, average oven life, and so on. Process 200 can then revise the generated collective optimized values (e.g., the oven life indicator value, the oven repair plan, or both) based on the received values of the miscellaneous parameters.

In several implementations, process 200 receives values of fuel parameters related to the ovens. Examples of fuel parameters include, but are not limited to, one or more of the following: natural gas parameters, nuclear power parameters, and so on. Process 200 can then revise the generated collective optimized values (e.g., the oven life indicator value, the oven repair plan, or both) based on the received values of the fuel parameters.

Process 200 can generate one or more reports to display the generated collective optimized values (and/or any intermediate computations) (at block 230). FIGS. 6-12 are example reports for visualizing various parameters and optimization results for ovens. FIG. 6 illustrates online performance of a plant's ovens. It lists the ovens within each target and then lists the worst ovens for each target. This allows process 200 to identify the worst ovens. In this example there are 268 ovens—conventional processes cannot evaluate them all efficiently and in a timely manner to identify any current and/or future problems. In contrast, as seen in FIG. 6, process 200 enables quick visualization to determine what ovens are the top ovens in trouble and should be the focus of attention for repair. FIG. 6 can be used by the operators in the field and by the plant supervisors. FIG. 7 is a more detailed version of FIG. 6 that is used by the engineers and some supervisors. It includes more details and a more granular look at the ovens. It allows for the system to provide sufficient information to enable engineers and supervisors to further coach the operators on actions to be taken. FIG. 8 also links to FIGS. 6 and 7. FIG. 8 illustrates the trends in the monitoring parameters and where the trend is out of range. The reason is that a single measurement does not always mean there is an issue. A trend indicates if it is a longer-term and actual issue. FIG. 9 folds in the inspection data (e.g., manual inspection data) that can be received periodically (e.g., quarterly, every 6 or 12 months, etc.). In general, if there are trending performance issues, they can be found in the inspection data of the oven(s). FIGS. 10 and 11 then combine the online operational data and its trends with the inspection reports. This can be then run through a correlation by process 200 to predict the life of every oven. This then allows the system to rank the poorest ovens and identify where work needs to be focused.

In several implementations, process 200, at block 235, can provide information to alter the state of one or more ovens based on the collective optimization values. As an example, for an oven with a low coke life, process 200 would look at the coke parameter and the inspection parameter. Process 200 would typically focus on the 10 worst ovens. Process 200 can then evaluate whether the ovens are from the same area on the battery and what repairs are needed. From the two correlations, process 200 can then determine the repairs needed. As an example, process 200 can find that there is oven damage. If the oven damage is severe, process 200 would also see poor performance. Consequently, process 200 would then evaluate repairing the oven and how much production will be gained back and how much oven life will be gained. This allows oven repair prioritization. This also allows process 200 to determine whether it is a local one-oven issue or a problem with the whole battery of ovens. An example of the latter can be all ovens in a battery section having a poor coke production factor but satisfactory inspection. This means there may be a systemic issue, such as low draft to the ovens in that area, which will be seen then in the temperature profiles, which is one of the monitored parameters.

In several implementations, the oven health optimization system 120 can compare an oven's performance to that of another oven, a stack of ovens, a battery of ovens, and so on. For example, the oven health optimization system 120 can generate (and/or access) an oven life indicator value for a first oven using generated values for the set of operation optimization parameters for the first oven and values of the selected set of inspection parameters for the first oven. It can also generate (and/or access) oven life indicator values for a set of ovens other than the first oven using generated values for the set of operation optimization parameters for the set of ovens other than the first oven and values of the selected set of inspection parameters for the set of ovens other than the first oven. Then it can generate a comparative performance measure for the first oven by comparing the generated oven life indicator value for the first oven and the generated oven life indicator values for the set of ovens other than the first oven. For example, the oven health optimization system 120 can list the worst and best ovens and a score for all ovens. The oven health optimization system 120 can plot the oven life for each oven versus its location. It can visually see if there are groupings of ovens with issues that could indicate the source of the problem. The oven health optimization system 120 can enable solving one or more problems that are impacting several ovens, resulting in increased efficiencies in time and costs and thus creating a big win for coke oven operators and managers. An example would be a group of ovens at the same HRSG with low coke production ratings but good inspections. If the temperature profiles are poor, then could be low draft at the ovens, which then could be a fouled HRSG.

Those skilled in the art will appreciate that the steps shown in FIG. 2 and in each of the flow diagrams discussed below may be altered in a variety of ways. For example, the order of the steps may be rearranged; substeps may be performed in parallel; shown steps may be omitted, or other steps may be included; etc.

Figure 3:
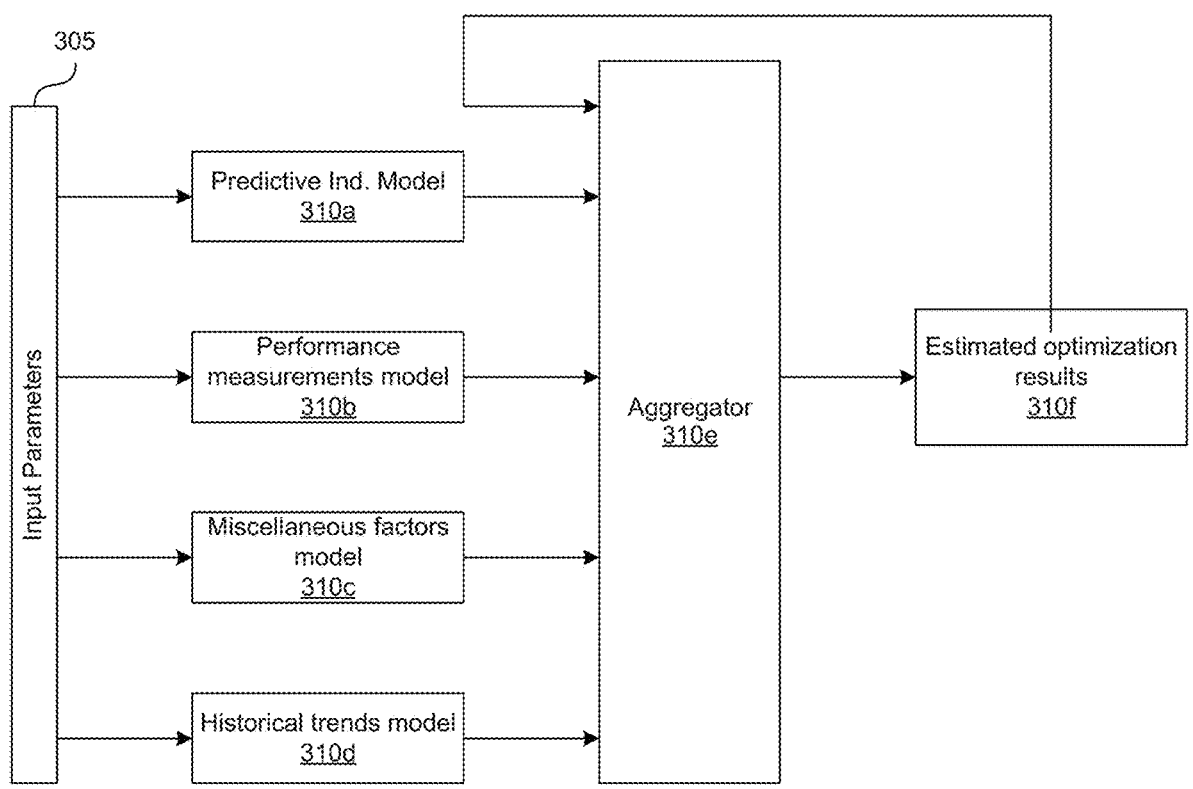
FIG. 3 is a block diagram illustrating some of the components of an oven health optimization system.

FIG. 3 is a block diagram illustrating some of the components of the oven health optimization system 120. In several implementations, the oven health optimization system 120 can generate values for the set of operation optimization parameters (estimated optimization results) 310*f* by subjecting one or more input parameters 305 to various models 310*a* . . . 310*d*. The oven health optimization system 120 can subject one or more subsets of input parameters (e.g., performance and/or inspection parameters) to different models, depending on a type of the input parameter. For example, the oven health optimization system 120 can subject parameters of predictive indicators type to a predictive indicators model 310*a*, parameters of performance measurements type to a performance measurements model 310*b*, parameters of miscellaneous type to a miscellaneous factors model 310*c*, and historical parameters to a historical trends model 310*d*. After generating results from each model, the oven health optimization system 120 can aggregate the results of these models using an aggregator 310*e* to generate values for the set of operation optimization parameters 310*f*. In some implementations, the model used by the oven health optimization system 120 is a complex model made up of (a) a number of different sub-models, each producing a set of optimization values based on one or more input parameter values, together with (b) a meta-model that uses input parameter values to determine a relative weighting of the sub-model valuations, which the oven health optimization system combines to obtain optimization values of ovens by the complex model.

Figure 4:
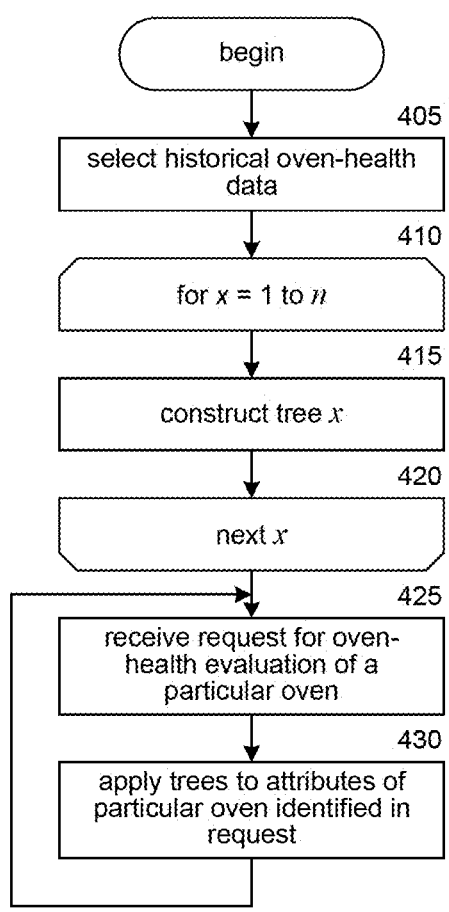
FIG. 4 is a flow diagram showing steps typically performed by an oven health optimization system to automatically determine optimization values for ovens.

In some implementations, the oven health optimization system constructs and/or applies models or sub-models that each constitute a forest of classification trees. FIG. 4 is a flow diagram showing steps typically performed by the oven health optimization system to automatically determine optimization values for ovens. At block 405, the oven health optimization system randomly selects a fraction of the ovens in the oven stack/battery/plant to which the tree corresponds, as well as a fraction of the available oven-related attributes, as a basis for the tree. FIG. 5 is a table diagram showing sample contents of an oven data table. The oven data table 500 is made up of rows, each representing an oven in a stack/battery/plant of ovens. Each row is divided into the following columns: identifier, oven model, age, production rate, coking rate, and remaining life. Attributes that may be used include, for example, one or more of the performance parameters, inspection parameters, miscellaneous parameters, and/or fuel parameters discussed above. While FIG. 5 shows an oven data table 500 whose contents and organization are designed to make them more comprehensible by a human reader, those skilled in the art will appreciate that actual data structures used by the oven health optimization system to store this information may differ from the table shown, in that they, for example, may be organized in a different manner; may contain more or less information than shown; may be compressed and/or encrypted; may contain a much larger number of rows/columns than shown; etc.

Returning to FIG. 4, at blocks 410-420, the oven health optimization system constructs and scores a number of trees. The number of trees is configurable, with larger numbers typically yielding better results but requiring the application of greater computing resources. At block 415, the oven health optimization system constructs a tree. In some embodiments, the oven health optimization system constructs and applies random forest valuation models.

At blocks 425-430, the oven health optimization system uses the forest of trees constructed and scored at blocks 405-420 to process requests for oven health evaluations. Such requests may be individually issued by users or issued by a program, such as a program that automatically requests oven health-related data for all ovens or substantially all ovens in a stack/battery/plant at a standard frequency, such as daily. At block 425, the oven health optimization system receives a request for oven health evaluation identifying the oven to be evaluated. At block 430, the facility applies the trees constructed at block 415, weighted by the scores, to the attributes of the oven identified in the received request in order to obtain an oven health evaluation for the oven identified in the request. After block 430, the oven health optimization system continues at block 425 to receive the next request.

In some implementations, a system for optimizing oven profitability is disclosed. The system comprises at least one coke oven for treating coal, wherein the at least one coke oven processes coal to produce coke. The system further comprises at least one oven health optimization system for optimizing profitability of the at least one coke oven, the at least one oven health optimization system comprising at least one hardware processor and at least one non-transitory memory, coupled to the at least one hardware processor and storing instructions, which, when executed by the at least one hardware processor, perform a process. The process comprises receiving a selection of at least one output parameter that measures oven profitability. The process further comprises selecting a set of performance parameters based on the selected at least one output parameter. The process then generates values for a set of operation optimization parameters using values of the set of selected performance parameters, wherein the set of operation optimization parameters comprises at least one of the following coke push grade, soak time, or environmental factors. The process selects a set of inspection parameters based on the selected at least one output parameter. The process generates an oven life indicator value, an oven repair plan, or both, using the generated values for the set of operation optimization parameters and values of the selected set of inspection parameters.

In some implementations, a computer-implemented method for optimizing oven profitability is disclosed. The method comprises receiving a selection of at least one output parameter that measures oven profitability of at least one coke oven for treating coal, wherein the at least one coke oven processes coal to produce coke. The method selects a set of performance parameters based on the selected at least one output parameter. The method generates values for a set of operation optimization parameters using values of the set of selected performance parameters, wherein the set of operation optimization parameters comprises at least one of coke push grade, soak time, or environmental factors. The method selects a set of inspection parameters based on the selected at least one output parameter. The method generates an oven life indicator value, an oven repair plan, or both, using the generated values for the set of operation optimization parameters and values of the selected set of inspection parameters.

In some implementations, a non-transitory computer-readable medium storing instructions is disclosed. The instructions, which when executed by at least one computing device, perform a method for optimizing oven profitability. The method comprises receiving a selection of at least one output parameter that measures oven profitability of at least one coke oven for treating coal, wherein the at least one coke oven processes coal to produce coke. The method selects a set of performance parameters based on the selected at least one output parameter. The method generates values for a set of operation optimization parameters using values of the set of selected performance parameters, wherein the set of operation optimization parameters comprises at least one of coke push grade, soak time, or environmental factors. The method selects a set of inspection parameters based on the selected at least one output parameter. The method generates an oven life indicator value, an oven repair plan, or both, using the generated values for the set of operation optimization parameters and values of the selected set of inspection parameters.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected" or "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative combinations or subcombinations. Each of these processes, message/data flows, or blocks can be implemented in a variety of different ways. Also, while processes or blocks are at times shown as being performed in series, these processes or blocks can instead be performed in parallel or can be performed at different times. Further, any specific numbers noted herein are only examples: alternative implementations can employ differing values or ranges.

The teachings of the methods and system provided herein can be applied to other systems, not necessarily the system described above. The elements, blocks, and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

We claim:

1. A system for optimizing oven profitability, the system comprising:
   a coke oven configured to process coal to produce coke, wherein operation of the coke oven produces historical coke oven data including coke production over time and coking rate for the coke oven; and
   an oven health optimization system for optimizing profitability of the coke oven, the oven health optimization system comprising:
      at least one hardware processor; and
      non-transitory memory, coupled to the at least one hardware processor and storing instructions, which when executed by the at least one hardware processor, perform a process comprising:
         receiving the historical coke oven data;
         receiving a selection of output parameters that measure oven profitability, wherein the output parameters include the coke production over time and the coking rate for the coke oven;
         selecting a set of performance parameters based on the selected output parameters, wherein the set of performance parameters includes output coke properties for the coke oven;
         generating values for a set of operation optimization parameters using values of the set of selected performance parameters,
            wherein the set of operation optimization parameters comprises at least one of coke push grade, soak time, or oven performance for the coke oven;
         selecting a set of inspection parameters based on the selected output parameters, wherein the set of inspection parameters includes oven age, number of coking cycles, and at least one of (i) crown temperature, (ii) coke-side temperature, (iii) pusher-side temperature, or (iv) sole flue temperature;
         generating an oven life indicator value for the coke oven using the generated values for the set of operation optimization parameters and values of the selected set of inspection parameters; and
         based on the oven life indicator value, altering a state of the coke oven.

2. The system as recited in claim 1, wherein the output parameters that measure oven profitability further comprise:
   return on investment (ROI) on repair of the coke oven,
   cost to repair the coke oven,
   cost to rebuild the coke oven,
   cost to abandon the coke oven,
   profitability of the coke oven,
   remaining life of the coke oven,
   damage to the coke oven,
   rate of aging,
   aging as a function of tons run through the coke oven,
   aging as a function of operating conditions in the coke oven,
   closing gain,
   opening gain,
   damage score,
   environmental score,
   permit requirements,
   output quality,
   power production,
   or any combination thereof.

3. The system as recited in claim 1, wherein the set of operation optimization parameters further comprises:

quality,
yield,
rate,
power,
or any combination thereof.

4. The system as recited in claim 1, wherein the set of performance parameters comprises:
   production rate,
   oven health score,
   current spend on repairs,
   clinker amount,
   surface losses,
   heat released,
   air leakage,
   output coke properties,
   or any combination thereof.

5. The system as recited in claim 1, wherein the set of inspection parameters comprises:
   oven chamber inspection,
   oven crown inspection,
   oven mechanical inspection,
   configuration of the coke oven,
   condition of the coke oven,
   maintenance records of the coke oven,
   operation data of the coke oven,
   repair status of the coke oven,
   burners used,
   coal properties,
   regulatory compliance requirements,
   soak time,
   ambient conditions,
   logistical parameters,
   mechanical production parameters,
   damper block condition,
   leaks,
   severity of operation,
   fissure line formation,
   mass flow rate,
   burn loss,
   power production,
   complete coking time,
   elapsed coking time,
   cycle length,
   sole flue peak temperature,
   draft,
   sole flue peak time,
   first crossover time,
   last crossover time,
   crown peak time,
   position control scheme,
   charge weight,
   wharf performance,
   burner feedback,
   door fires,
   lance usage,
   uptake,
   oxygen intake,
   downtime,
   or any combination thereof.

6. The system as recited in claim 1, wherein receiving the historical coke oven data comprises:
   receiving values of historical trends parameters from a set of historical trends parameters related to the coke oven; and
   revising the generated oven life indicator value by subjecting a subset of the values of the historical trends parameters using a historical trends model.

7. The system as recited in claim 1, wherein the process further comprises:
   receiving values of miscellaneous parameters from a set of miscellaneous parameters related to the coke oven, wherein the set of miscellaneous parameters comprises:
      cost to repair oven,
      cost to rebuild oven,
      cost to abandon oven,
      average oven life,
      or any combination thereof; and
   revising the generated oven life indicator value based on the received values of the miscellaneous parameters.

8. The system as recited in claim 1, wherein the process further comprises:
   receiving values of fuel parameters related to the coke oven,
      wherein the fuel parameters comprise:
         natural gas parameters,
         fuel oil parameters,
         number of lances/burners employed,
         or any combination thereof; and
   revising the generated oven life indicator value based on the received values of the fuel parameters.

9. The system as recited in claim 1, wherein the coke oven is a first coke oven, and the process further comprises:
   generating oven life indicator values for a set of ovens other than the first coke oven using generated values for the set of operation optimization parameters for the set of ovens other than the first coke oven and values of the selected set of inspection parameters for the set of ovens other than the first coke oven; and
   generating a comparative performance measure for the first coke oven by comparing the generated oven life indicator value for the first coke oven and the generated oven life indicator values for the set of ovens other than the first coke oven.

10. The system as recited in claim 1, wherein the process further comprises:
    generating oven life indicator values for a set of ovens using generated values for the set of operation optimization parameters for the set of ovens and values of the selected set of inspection parameters for the set of ovens; and
    generating a priority of repair for ovens in the set of ovens by comparing the generated oven life indicator values for the set of ovens.

11. A non-transitory computer-readable medium storing instructions, which when executed by at least one computing device, perform a method for optimizing oven profitability, the method comprising:
    receiving historical coke oven data produced by operation of a coke oven, wherein the coke oven is configured to process coal to produce coke, and wherein the historical coke oven data includes coke production over time and coking rate for the coke oven;
    receiving a selection of output parameters that measure oven profitability of the coke oven for treating coal, wherein the output parameters include the coke production over time and the coking rate for the coke oven;
    selecting a set of performance parameters based on the selected output parameters, wherein the set of performance parameters includes output coke properties for the coke oven;
    generating values for a set of operation optimization parameters using values of the set of selected performance parameters, wherein the set of operation optimization parameters comprises at least one of coke push grade, soak time, or oven performance for the coke oven;

selecting a set of inspection parameters based on the selected output parameters, wherein the set of inspection parameters includes oven age, number of coking cycles, and at least one of (i) crown temperature, (ii) coke-side temperature, (iii) pusher-side temperature, or (iv) sole flue temperature; and generating an oven life indicator value for the coke oven, using the generated values for the set of operation optimization parameters and values of the selected set of inspection parameters; and based on the oven life indicator value, altering a state of the coke oven.

12. The non-transitory computer-readable medium as recited in claim 11, wherein the method further comprises:

receiving values of fuel parameters related to the coke oven,
wherein the fuel parameters comprise:
natural gas parameters,
fuel oil parameters,
number of lances/burners employed,
or any combination thereof; and revising the generated oven life indicator value based on the received values of the fuel parameters.

13. The non-transitory computer-readable medium as recited in claim 11, wherein the set of operation optimization parameters further comprises:

quality,
yield,
rate,
power,
or any combination thereof.

* * * * *

UNITED STATES PATENT AND TRADEMARK OFFICE
CERTIFICATE OF CORRECTION

| | | |
|---|---|---|
| PATENT NO. | : 12,227,699 B2 | Page 1 of 1 |
| APPLICATION NO. | : 17/135483 | |
| DATED | : February 18, 2025 | |
| INVENTOR(S) | : John Francis Quanci et al. | |

It is certified that error appears in the above-identified patent and that said Letters Patent is hereby corrected as shown below:

On the Title Page

On Page 7, Column 2, item [56], Line 31, delete "17,076,563," and insert --17/076,563,-- therefor.
On Page 9, Column 2, item [56], Line 41, delete "3, 3021," and insert --3, 2021,-- therefor.
On Page 9, Column 2, item [56], Line 55, delete "10,619, 101," and insert --10,619,101,-- therefor.
On Page 11, Column 1, item [56], Line 8, delete "abestos,"" and insert --asbestos,"-- therefor.
On Page 11, Column 1, item [56], Line 26, delete "18,892,228," and insert --18/892,228,-- therefor.

In the Specification

In Column 1, Line 55, delete "manufacturers" and insert --manufacturer's-- therefor.

Signed and Sealed this
Tenth Day of June, 2025

Coke Morgan Stewart
*Acting Director of the United States Patent and Trademark Office*